(12) United States Patent  (10) Patent No.: US 7,730,205 B2
Rothman et al.  (45) Date of Patent:  Jun. 1, 2010

(54) OS AGNOSTIC RESOURCE SHARING ACROSS MULTIPLE COMPUTING PLATFORMS

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1232 days.

(21) Appl. No.: 10/808,656

(22) Filed: Mar. 24, 2004

(65) Prior Publication Data

US 2005/0021847 A1  Jan. 27, 2005

Related U.S. Application Data

(63) Continuation-in-part of application No. 10/606,636, filed on Jun. 25, 2003.

(51) Int. Cl.
*G06F 15/173* (2006.01)
*G06F 13/00* (2006.01)
*G06F 13/42* (2006.01)

(52) U.S. Cl. .................. 709/238; 710/316; 340/825

(58) Field of Classification Search ............... None
See application file for complete search history.

(56) References Cited

U.S. PATENT DOCUMENTS

| 5,696,895 | A | 12/1997 | Hemphill et al. | |
| 5,884,096 | A | 3/1999 | Beasley et al. | |
| 6,477,618 | B2 | 11/2002 | Chilton | |
| 6,848,034 | B2 | 1/2005 | Cohn et al. | |
| 6,889,340 | B1 * | 5/2005 | Bramley, Jr. | 714/6 |
| 6,901,534 | B2 * | 5/2005 | Carr | 714/27 |

(Continued)

FOREIGN PATENT DOCUMENTS

WO   WO 00/68813   11/2000

(Continued)

OTHER PUBLICATIONS

PCT/US2004/018253, Sep. 22, 2005, International Search Report and Written Opinion.

(Continued)

*Primary Examiner*—Ario Etienne
*Assistant Examiner*—Ho Shiu
(74) *Attorney, Agent, or Firm*—Blakely, Sokoloff, Taylor & Zafman LLP

(57) ABSTRACT

Methods, apparatus, and systems for sharing resources across a plurality of computing platforms. Firmware provided on each platform is loaded for operating system runtime availability. Shared resources are presented to operating systems running on the platforms as local resources, while in reality they are generally hosted by other platforms. An operating system resource access request is received by a requesting platform and rerouted to another platform that actually hosts a target resource used to service the resource access request. Global resource maps are employed to determine the appropriate host platforms. Communications between the platforms is enabled via an out-of-band (OOB) communication channel or network. A hidden execution mode is implemented to effectuate data rerouting via the OOB channel such that the method is performed in a manner that is transparent to operating systems running on the platforms. The shared resources include storage, input, and video devices. The method can be used to support shared KVM (keyboard, video and mouse) resources.

31 Claims, 16 Drawing Sheets

U.S. PATENT DOCUMENTS

| | | | |
|---|---|---|---|
| 6,968,414 B2 | 11/2005 | Abbondanzio et al. | |
| 7,003,563 B2 | 2/2006 | Leigh et al. | |
| 7,073,059 B2* | 7/2006 | Worely et al. | 713/168 |
| 7,114,180 B1* | 9/2006 | DeCaprio | 726/18 |
| 7,191,347 B2 | 3/2007 | Bigelow et al. | |
| 7,225,245 B2 | 5/2007 | Gurumoorthy et al. | |
| 7,269,630 B2 | 9/2007 | Abbondanzio et al. | |
| 7,339,786 B2 | 3/2008 | Bottom et al. | |
| 7,343,441 B1* | 3/2008 | Chrysanthakopoulos et al. | 710/313 |
| 7,376,974 B2* | 5/2008 | Proudler et al. | 726/27 |
| 7,398,293 B2 | 7/2008 | Ramsey et al. | |
| 7,440,998 B2* | 10/2008 | Hiray et al. | 709/203 |
| 2002/0059170 A1 | 5/2002 | Vange | |
| 2002/0124114 A1 | 9/2002 | Bottom et al. | |
| 2002/0124134 A1 | 9/2002 | Chilton | |
| 2002/0143996 A1* | 10/2002 | Odryna et al. | 709/246 |
| 2003/0033397 A1* | 2/2003 | Gurumoorthy et al. | 709/223 |
| 2003/0074431 A1 | 4/2003 | Abbondanzio et al. | |
| 2003/0088655 A1* | 5/2003 | Leigh et al. | 709/223 |
| 2003/0191908 A1 | 10/2003 | Cohn et al. | |
| 2003/0200345 A1* | 10/2003 | Ramsey et al. | 709/253 |
| 2003/0226031 A1* | 12/2003 | Proudler et al. | 713/200 |
| 2004/0128562 A1* | 7/2004 | Bigelow et al. | 713/300 |
| 2004/0181601 A1* | 9/2004 | Sakthikumar | 709/229 |
| 2004/0260936 A1* | 12/2004 | Hiray et al. | 713/200 |

FOREIGN PATENT DOCUMENTS

| | | | |
|---|---|---|---|
| WO | WO 01/97016 A2 | 12/2001 | |

OTHER PUBLICATIONS

Office Action mailed Feb. 21, 2007, U.S. Appl. No. 10/606,636, filed Jun. 25, 2003, "OS Agnostic Resource Sharing Across Multiple Computing Platforms".

PCT/US2004/018253, Jun. 6, 2005, PCT Invitation to Pay Additional Fees.

Office Action mailed Jan. 22, 2008, U.S. Appl. No. 10/606,636, filed Jun. 25, 2003, "OS Agnostic Resource Sharing Across Multiple Computing Platforms".

International Preliminary Report on Patentability and Written Opinions of the International Search Authority, Dated Apr. 11, 2007, No. PCT/US2004/018259.

Office Action mailed Jul. 25, 2007, U.S. Appl. No. 10/606,636, filed Jun. 25, 2003, "OS Agnostic Resource Sharing Across Multiple Computing Platforms."

Harigae, Makoto, et al., "A Virtual Disk System using a PC Cluster," IPSJ SIG Notes, Information Processing Society of Japan, Aug. 7, 1998, vol. 98, No. 70, pp. 151-156.

Office Action mailed on Aug. 6, 2008, U.S. Appl. No. 10/606,636, filed Jun. 25, 2003.

Office Action mailed on Feb. 12, 2009, U.S. Appl. No. 10/606,636, filed Jun. 25, 2003.

Office Action dated May 27, 2008, Japanese Patent Application No. 2006-509095, filed Jun. 9, 2004.

Office Action dated Apr. 24, 2008, European Patent Application No. 04 754 766.6-2211, filed Jun. 9, 2004.

Office Action dated Feb. 13, 2009, Chinese Patent Application No. 200480018034.8, filed Jun. 9, 2004.

* cited by examiner

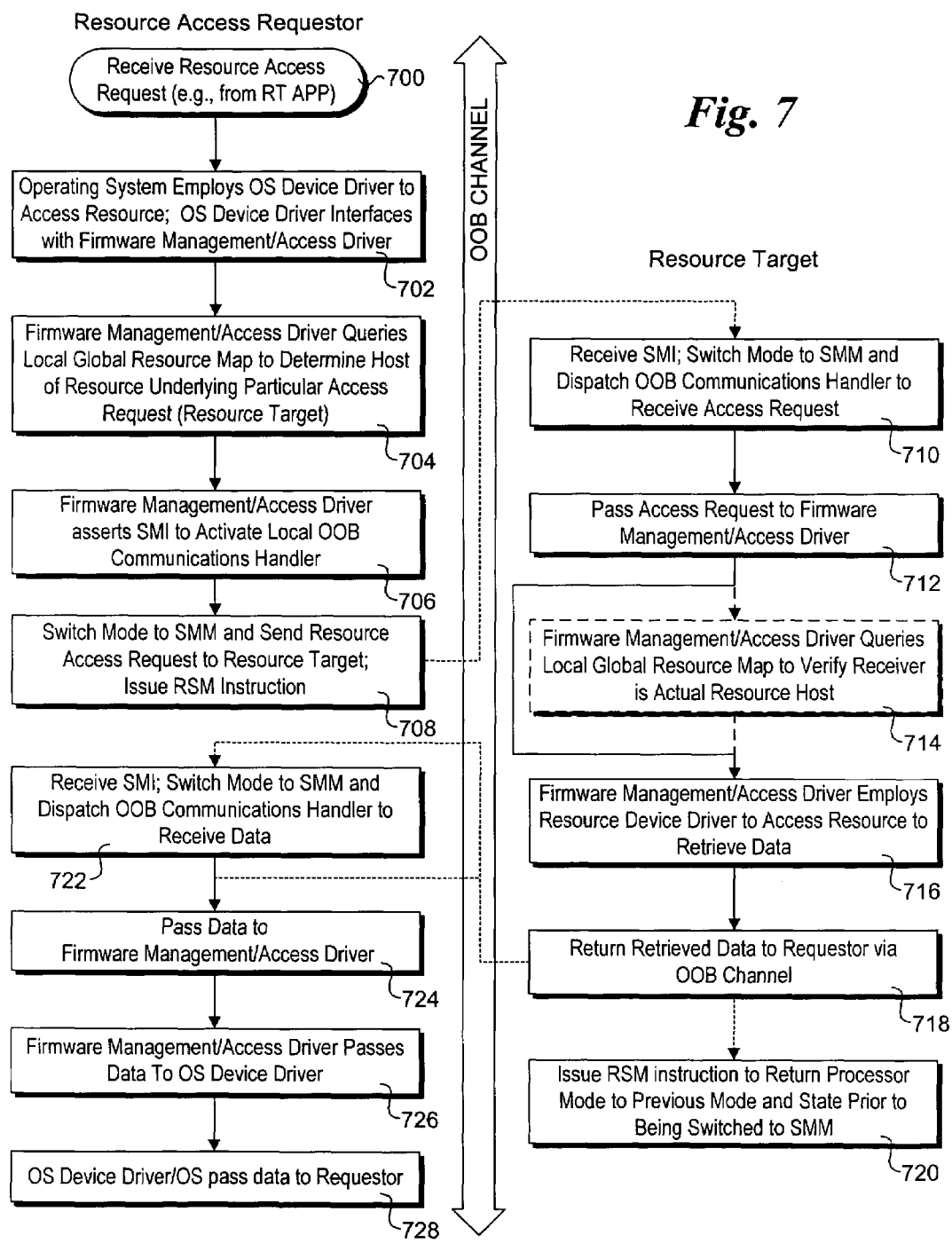

OS AGNOSTIC RESOURCE SHARING ACROSS MULTIPLE COMPUTING PLATFORMS

CROSS REFERENCE TO RELATED APPLICATIONS

The present application is a continuation-in-part of U.S. patent application Ser. No. 10/606,636 entitled "OS AGNOSTIC RESOURCE SHARING ACROSS MULTIPLE COMPUTING PLATFORMS," filed Jun. 25, 2003, the benefit of the priority date of which is claimed under U.S.C. 35 §120.

FIELD OF THE INVENTION

The field of invention relates generally to clustered computing environments, such as blade server computing environments, and, more specifically but not exclusively relates to techniques for sharing resources hosted by individual platforms (nodes) to create global resources that may be shared across all nodes.

BACKGROUND INFORMATION

Information Technology (IT) managers and Chief Information Officers (CIOs) are under tremendous pressure to reduce capital and operating expenses without decreasing capacity. The pressure is driving IT management to provide computing resources that more efficiently utilize all infrastructure resources. To meet this objective, aspects of the following questions are often addressed: How to better manage server utilization; how to cope with smaller IT staff levels; how to better utilize floor space; and how to handle power issues.

Typically, a company's IT (information technology) infrastructure is centered around computer servers that are linked together via various types of networks, such as private local area networks (LANs) and private and public wide area networks (WANs). The servers are used to deploy various applications and to manage data storage and transactional processes. Generally, these servers will include stand-alone servers and/or higher density rack-mounted servers, such as 4U, 2U and 1U servers.

Recently, a new server configuration has been introduced that provides unprecedented server density and economic scalability. This server configuration is known as a "blade server." A blade server employs a plurality of closely-spaced "server blades" (blades) disposed in a common chassis to deliver high-density computing functionality. Each blade provides a complete computing platform, including one or more processors, memory, network connection, and disk storage integrated on a single system board. Meanwhile, other components, such as power supplies and fans, are shared among the blades in a given chassis and/or rack. This provides a significant reduction in capital equipment costs when compared to conventional rack-mounted servers.

Generally, blade servers are targeted towards two markets: high density server environments under which individual blades handle independent tasks, such as web hosting; and scaled computer cluster environments. A scalable compute cluster (SCC) is a group of two or more computer systems, also known as compute nodes, configured to work together to perform computational-intensive tasks. By configuring multiple nodes to work together to perform a computational task, the task can be completed much more quickly than if a single system performed the tasks. In theory, the more nodes that are applied to a task, the quicker the task can be completed. In reality, the number of nodes that can effectively be used to complete the task is dependent on the application used.

A typical SCC is built using Intel®-based servers running the Linux operating system and cluster infrastructure software. These servers are often referred to as commodity off the shelf (COTS) servers. They are connected through a network to form the cluster. An SCC normally needs anywhere from tens to hundreds of servers to be effective at performing computational-intensive tasks. Fulfilling this need to group a large number of servers in one location to form a cluster is a perfect fit for a blade server. The blade server chassis design and architecture provides the ability to place a massive amount of computer horsepower in a single location. Furthermore, the built-in networking and switching capabilities of the blade server architecture enables individual blades to be added or removed, enabling optimal scaling for a given tasks. With such flexibility, blade server-based SCC's provides a cost-effective alternative to other infrastructure for performing computational tasks, such as supercomputers.

As discussed above, each blade in a blade server is enabled to provide full platform functionality, thus being able to operate independent of other blades in the server. However, the resources available to each blade are likewise limited to it own resources. Thus, in many instances resources are inefficiently utilized. Under current architectures, there is no scheme that enables efficient server-wide resource sharing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1b is a rear isometric view of the blade server chassis of FIG. 1a;

FIG. 7 is a flowchart illustrating operations and logic employed in response to a resource access request received at a requesting computing platform to service the request in accordance with one embodiment of the invention, wherein the servicing resource is hosted by another computing platform;

FIG. 10a is a schematic diagram illustrating further details of the virtual volume storage scheme of FIG. 9a;

DETAILED DESCRIPTION OF PREFERRED EMBODIMENTS

Figure 1A:
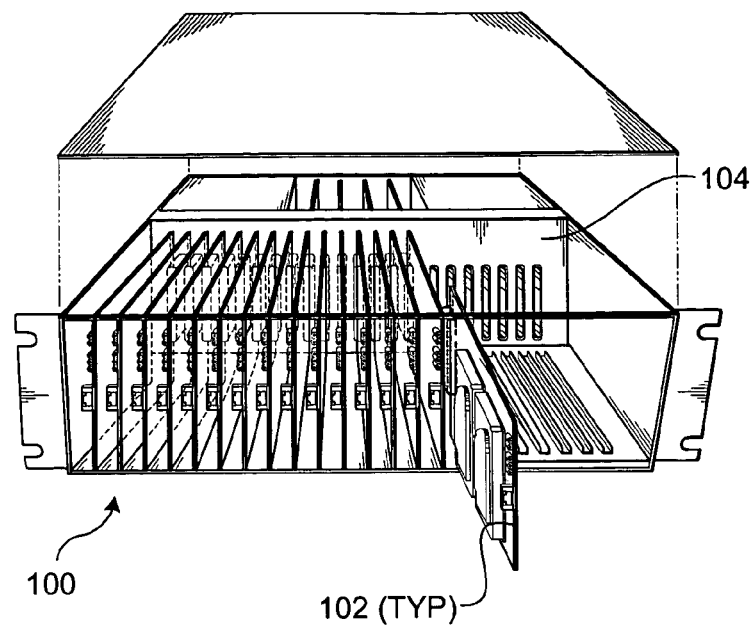
FIG. 1a is a frontal isometric view of an exemplary blade server chassis in which a plurality of server blades are installed.

Embodiments of methods and computer components and systems for performing resource sharing across clustered platform environments, such as a blade server environment, are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, techniques are disclosed herein for sharing resources across clustered platform environments in a manner under which resources hosted by individual platforms are made accessible to other platform nodes The techniques employ firmware-based functionality that provides a "behind the scenes" access mechanisms without requiring any OS complicity. In fact, the resource sharing and access operations are completely transparent to operating systems running on the blades, and thus operating system independent. Thus, the capabilities afforded by the novel techniques disclosed herein may be employed in existing and future distributed platform environments without requiring any changes to the operating systems targeted for the environments.

In accordance with one aspect, the resource-sharing mechanism is effectuated by several platforms that "expose" resources that are aggregated to form global resources. Each platform employs a respective set of firmware that runs prior to the operating system load (pre-boot) and coincident with the operating system runtime. In one embodiment, runtime deployment is facilitated by a hidden execution mode known as the System Management Mode (SMM), which has the ability to receive and respond to periodic System Management Interrupts (SMI) to allow resource sharing and access information to be transparently passed to firmware SMM code configured to effectuate the mechanisms. The SMM resource management code conveys information and messaging to other nodes via an out-of-band (OOB) network or communication channel in an OS-transparent manner.

For illustrative purposes, several embodiments of the invention are disclosed below in the context of a blade server environment. As an overview, typical blade server components and systems for which resource sharing schemes in accordance with embodiments of the invention may be generally implemented are shown in FIGS. 1a-c and 2. Under a typical configuration, a rack-mounted chassis 100 is employed to provide power and communication functions for a plurality of blades 102, each of which occupies a corresponding slot. (It is noted that all slots in a chassis do not need to be occupied.) In turn, one or more chassis 100 may be installed in a blade server rack 103 shown in FIG. 1c. Each blade is coupled to an interface plane 104 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 1B:
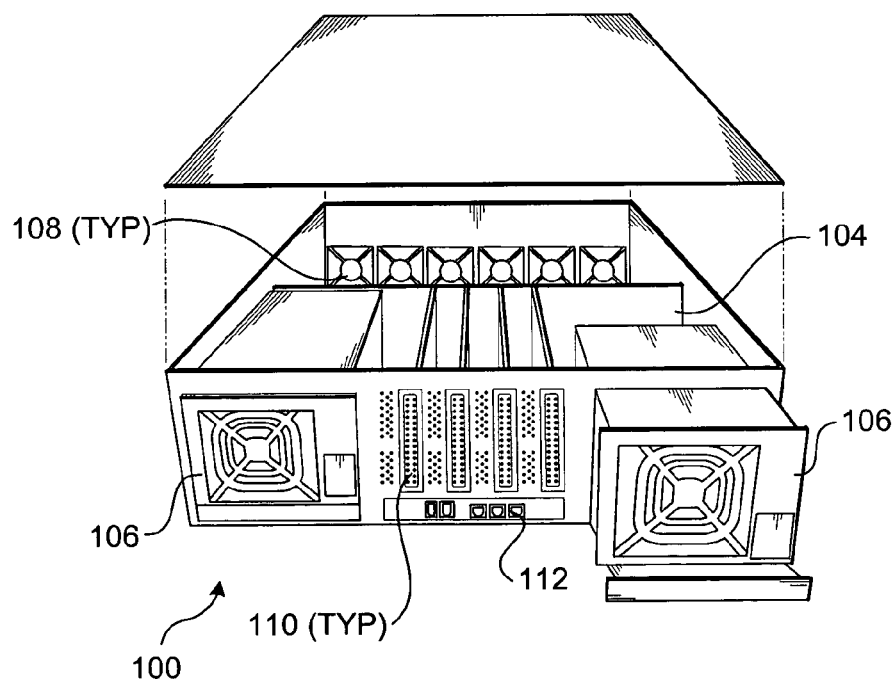
Figure 1C:
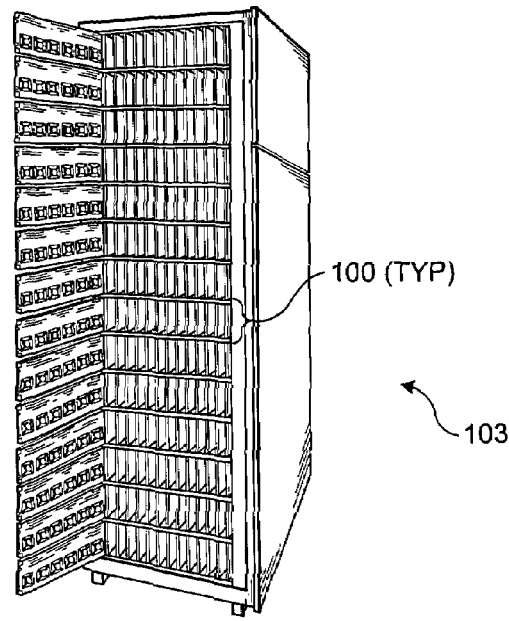
FIG. 1c is an isometric frontal view of an exemplary blade server rack in which a plurality of rack-mounted blade server chassis corresponding to FIGS. 1a and 1b are installed.

A typical mid-plane interface plane configuration is shown in FIGS. 1a and 1b. The backside of interface plane 104 is coupled to one or more power supplies 106. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 108 are employed to draw air through the chassis to cool the server blades.

An important feature required of all blade servers is the ability to communicate externally with other IT infrastructure. This is typically facilitated via one or more network connect cards 110, each of which is coupled to interface plane 104. Generally, a network connect card may include a physical interface comprising a plurality of network port connections (e.g., RJ-45 ports), or may comprise a high-density connector designed to directly connect to a network device, such as a network switch, hub, or router.

Blades servers usually provide some type of management interface for managing operations of the individual blades. This may generally be facilitated by an out-of-band network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management card 112 that is coupled to the backside or frontside of the interface plane. As yet another option, a management server may be employed to manage blade activities, wherein communications are handled via standard computer networking infrastructure, such as Ethernet.

Figure 2:
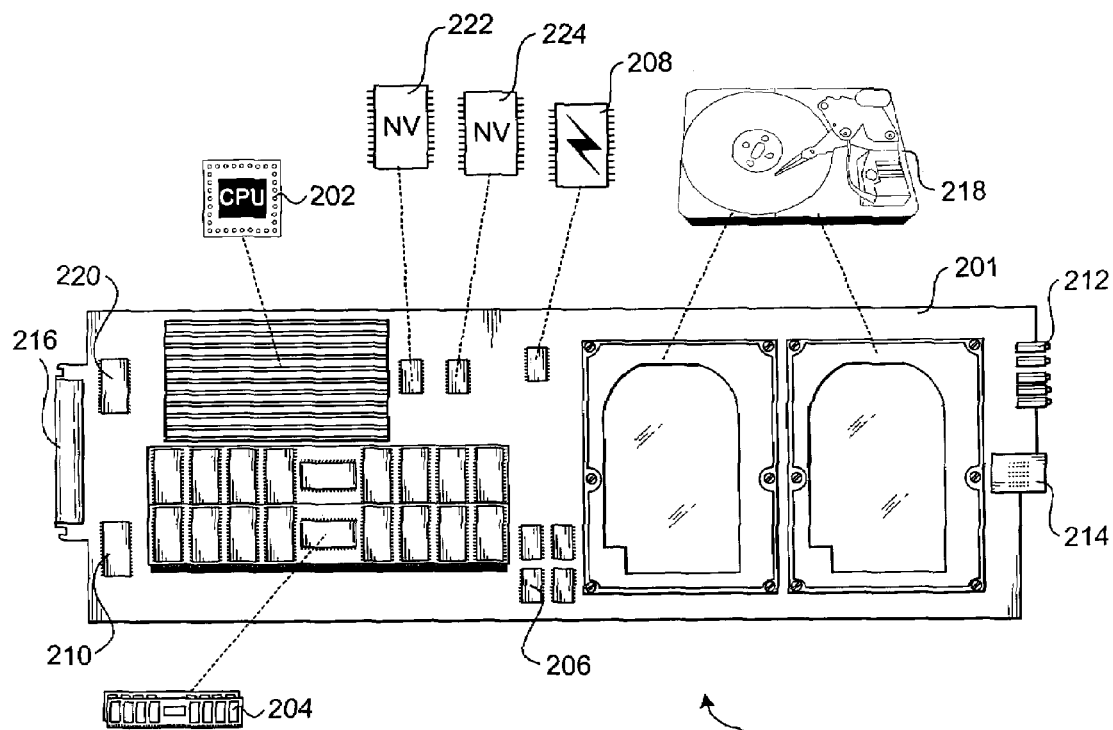
FIG. 2 shows details of the components of a typical server blade.

With reference to FIG. 2, further details of an exemplary blade 200 are shown. As discussed above, each blade comprises a separate computing platform that is configured to perform server-type functions, i.e., is a "server on a card." Accordingly, each blade includes components common to conventional servers, including a main circuit board 201 providing internal wiring (i.e., buses) for coupling appropriate integrated circuits (ICs) and other components mounted to the board. These components include one or more processors 202 coupled to system memory 204 (e.g., DDR RAM), cache memory 206 (e.g., SDRAM), and a firmware storage device 208 (e.g., flash memory). A "public" NIC (network interface) chip 210 is provided for supporting conventional network communication functions, such as to support communication between blades and external network infrastructure. Other illustrated components include status LEDs 212, an RJ-45 console port 214, and an interface plane connector 216. Additional components include various passive components (e.g., resistors, capacitors), power conditioning components, and peripheral device connectors.

Generally, each blade 200 will also provide on-board storage. This is typically facilitated via one or more built-in disk controllers and corresponding connectors to which one or more disk drives 218 are coupled. For example, typical disk controllers include Ultra ATA controllers, SCSI controllers, and the like. As an option, the disk drives may be housed separate from the blades in the same or a separate rack, such as might be the case when a network-attached storage (NAS) appliance is employed to storing large volumes of data.

In accordance with aspects of the invention, facilities are provided for out-of-band communication between blades, and optionally, dedicated management components. As used herein, an out-of-band communication channel comprises a communication means that supports communication between devices in an OS-transparent manner—that is, a means to enable inter-blade communication without requiring operating system complicity. Generally, various approaches may be employed to provide the OOB channel. These include but are not limited to using a dedicated bus, such as a system management bus that implements the SMBUS standard (www.smbus.org), a dedicated private or management network, such as an Ethernet-based network using VLAN-802.1Q), or a serial communication scheme, e.g., employing the RS-485 serial communication standard. One or more appropriate IC's for supporting such communication functions are also mounted to main board 201, as depicted by an OOB channel chip 220. At the same time, interface plane 104 will include corresponding buses or built-in network traces to support the selected OOB scheme. Optionally, in the case of a wired network scheme (e.g., Ethernet), appropriate network cabling and networking devices may be deployed inside or external to chassis 100.

As discussed above, embodiments of the invention employ a firmware-based scheme for effectuating a resource sharing set-up and access mechanism to enable sharing of resources across blade server nodes. In particular, resource management firmware code is loaded during initialization of each blade and made available for access during OS run-time. Also during initialization, resource information is collected, and global resource information is built. Based on the global resource information, appropriate global resource access is provided back to each blade. This information is handed off to the operating system upon its initialization, such that the global resource appears (from the OS standpoint) as a local resource. During OS runtime operations, accesses to the shared resources are handled via interaction between OS and/or OS drivers and corresponding firmware in conjunction with resource access management that is facilitated via the OOB channel.

In one embodiment, resource sharing is facilitated via an extensible firmware framework known as Extensible Firmware Interface (EFI) (specifications and examples of which may be found at http://developer.intel.com/technology/efi). EFI is a public industry specification (current version 1.10 released Jan. 7, 2003) that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

Figure 3:
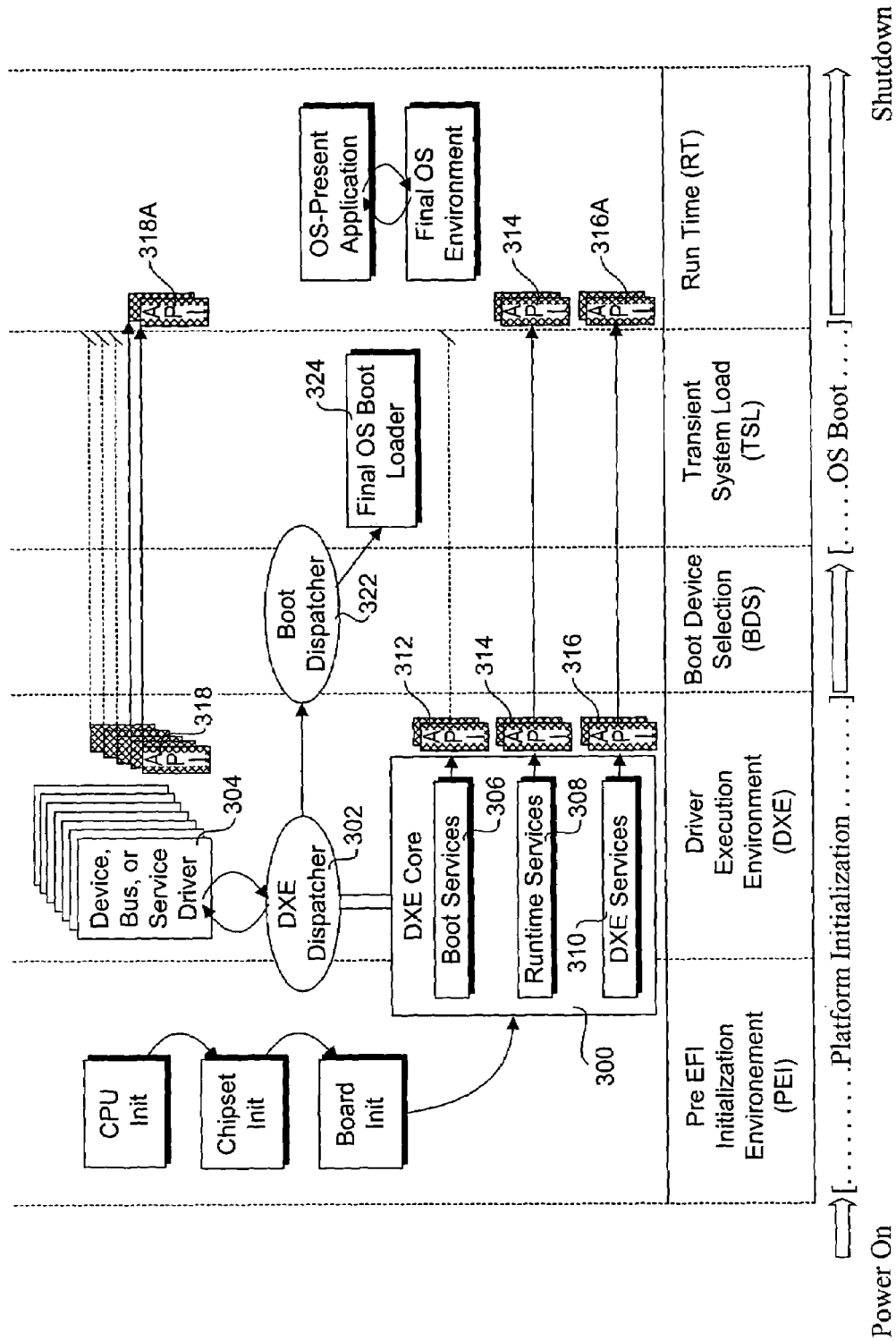
FIG. 3 is a schematic block diagram illustrating various firmware and operating system components used to deploy power management in accordance with the ACPI standard.

FIG. 3 shows an event sequence/architecture diagram used to illustrate operations performed by a platform under the framework in response to a cold boot (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor (CPU), chipset, and motherboard. The PEI phase is responsible for initializing enough of the system to provide a stable base for the follow on phases. Initialization of the platforms core components, including the CPU, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 300, the DXE dispatcher 302, and a set of DXE drivers 304. The DXE core 300 produces a set of Boot Services 306, Runtime Services 308, and DXE Services 310. The DXE dispatcher 302 is responsible for discovering and executing DXE drivers 304 in the correct order. The DXE drivers 304 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This further means the DXE core can be loaded anywhere in physical memory, and it can function correctly no matter where physical memory or where Firmware segments are located in the processor's physical address space. Third, the DXE core does not contain any CPU-specific, chipset specific, or platform specific information. Instead, the DXE core is abstracted from the system hardware through a set of architectural protocol interfaces. These architectural protocol interfaces are produced by DXE drivers 304, which are invoked by DXE Dispatcher 302.

Figure 4:
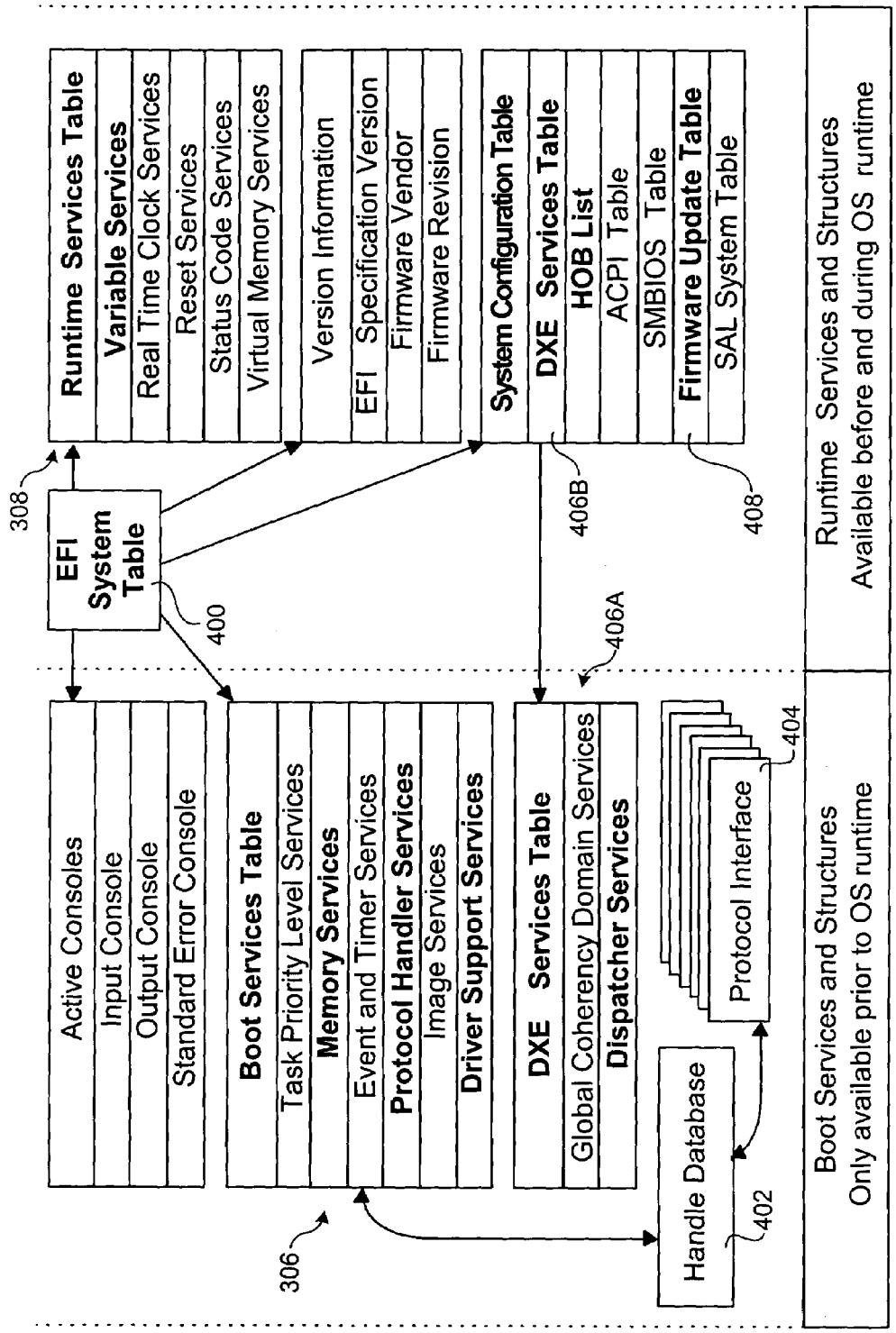
FIG. 4 is a flowchart illustrating operations and logic employed during blade initialization to configure a blade for implementing a power management scheme in accordance with one embodiment of the invention.

The DXE core produces an EFI System Table 400 and its associated set of Boot Services 306 and Runtime Services 308, as shown in FIG. 4. The DXE core also maintains a handle database 402. The handle database comprises a list of one or more handles, wherein a handle is a list of one or more unique protocol GUIDs (Globally Unique Identifiers) that map to respective protocols 404. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

In contrast to Boot Services, Runtime Services are available both during pre-boot and OS runtime operations. One of the Runtime Services that is leveraged by embodiments disclosed herein is the Variable Services. As described in further detail below, the Variable Services provide services to lookup, add, and remove environmental variables from both volatile and non-volatile storage.

The DXE Services Table includes data corresponding to a first set of DXE services 406A that are available during pre-boot only, and a second set of DXE services 406B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 306, Runtime Services 308, and DXE services 310 are accessed via respective sets of API's 312, 314, and 316. The API's provide an abstracted interface that enables subsequently loaded components to leverage selected services provided by the DXE Core.

After DXE Core 300 is initialized, control is handed to DXE Dispatcher 302. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the EFI 1.10 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers must use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the Install Configuration Table function. This published drivers are depicted by API's 318. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 320 is used during the BDS phase to enable selection of a Boot target, e.g., an OS to be booted by the system.

During the TSL phase, a final OS Boot loader 322 is run to load the selected OS. Once the OS has been loaded, there is no further need for the Boot Services 306, and for many of the services provided in connection with DXE drivers 304 via API's 318, as well as DXE Services 306A. Accordingly, these reduced sets of API's that may be accessed during OS runtime are depicted as API's 316A, and 318A in FIG. 3.

Figure 8A:
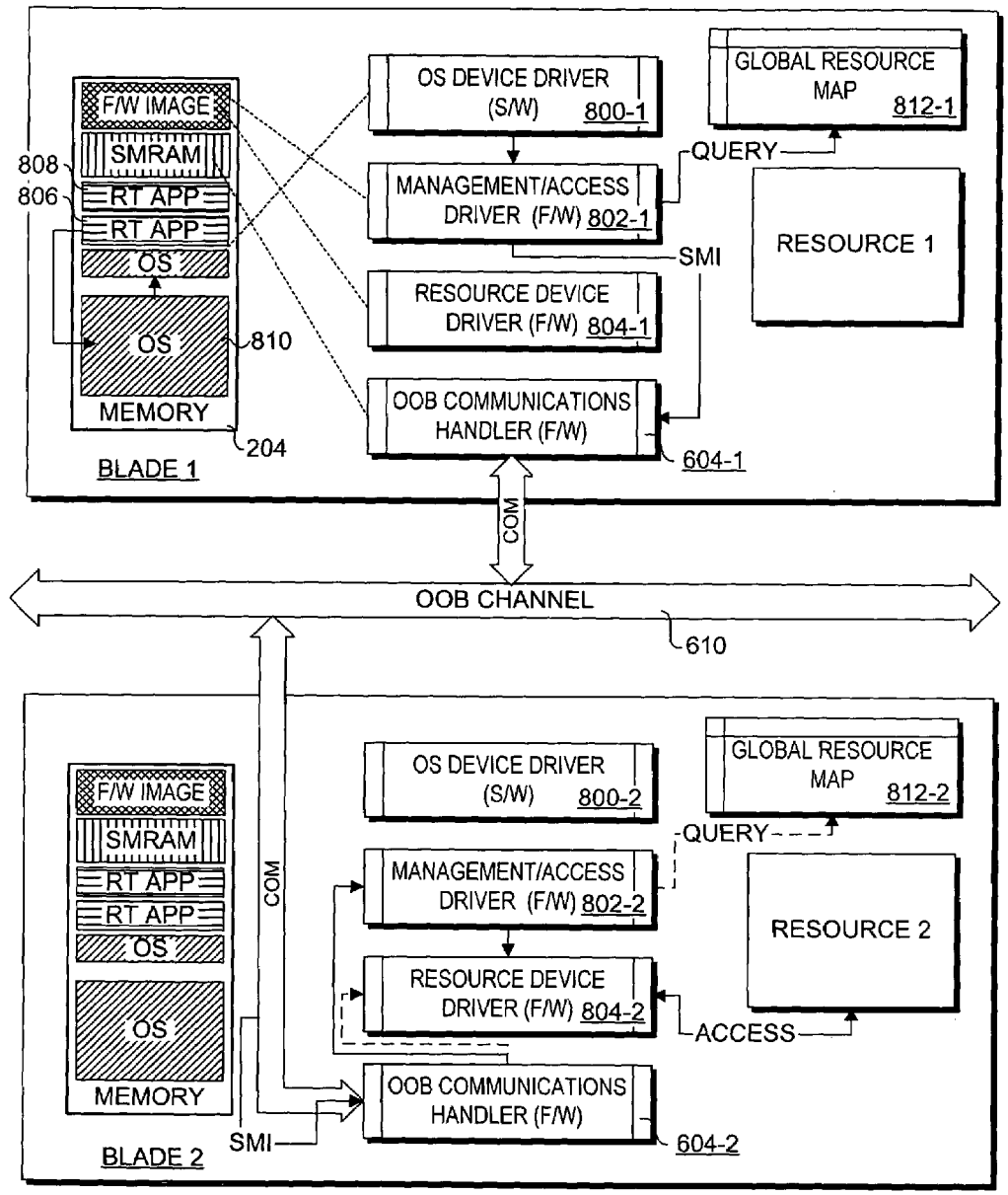
FIGS. 8a and 8b are schematic diagrams illustrating data flows between a pair of computing platforms during a shared resource access, wherein the scheme illustrated in FIG. 8a employs local global resource maps, and the scheme illustrated in FIG. 8b employs a single global resource map hosted by a global resource manager.
Figure 8B:
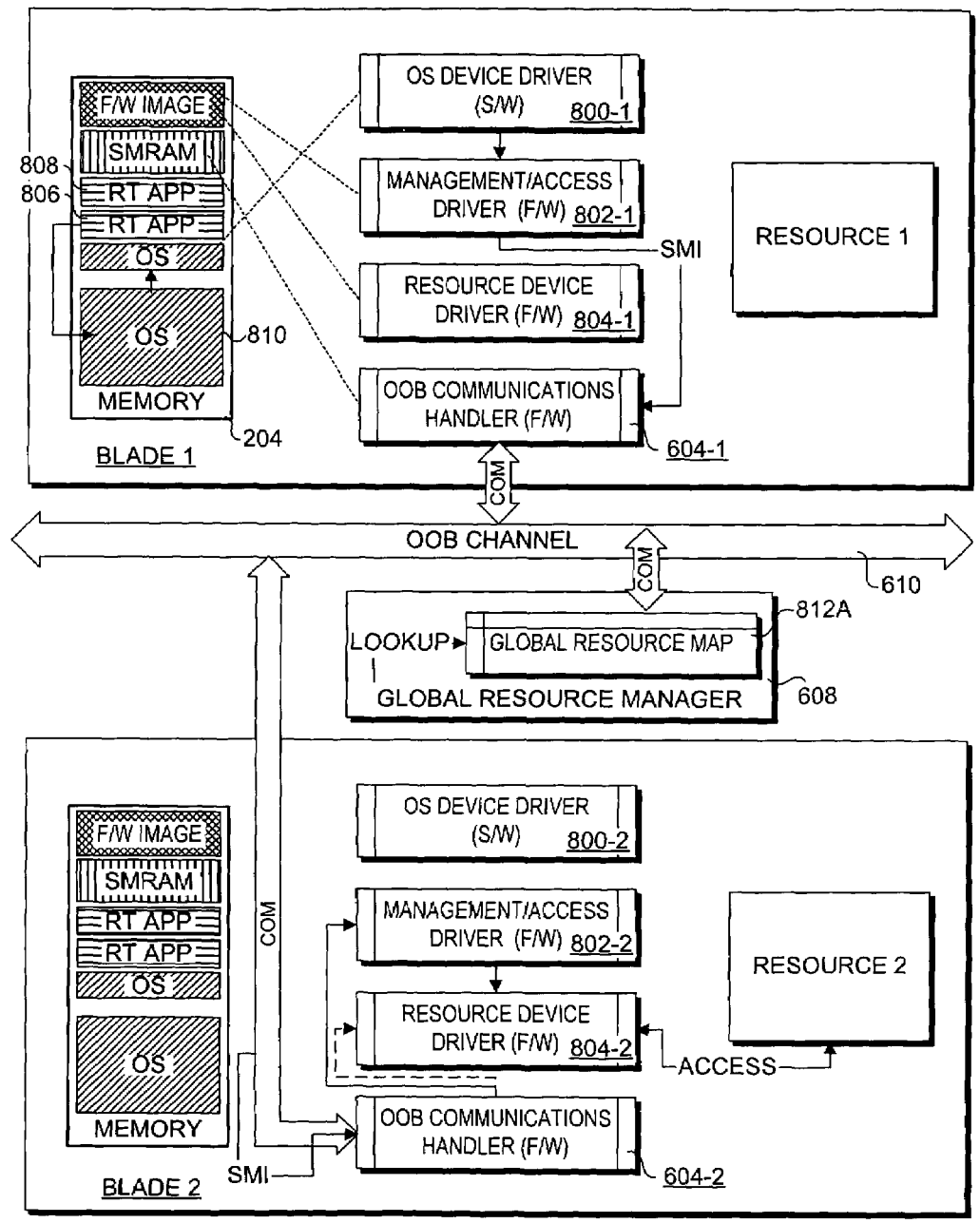

Under principles of an embodiment of the invention, an OS-transparent out-of-band communication scheme is employed to allow various types of resources to be shared across server nodes. At the same time, firmware-based components (e.g., firmware drivers and API's) are employed to facilitate low-level access to the resources and rerouting of data over the OOB channel. The scheme may be effectuated across multiple computing platforms, including groups of blades, individual chassis, racks, or groups of racks. During system initialization, firmware provided on each platform is loaded and executed to set up the OOB channel and appropriate resource access and data re-routing mechanisms. Each blade then transmits information about its shared resources over the OOB to a global resource manager. The global resource manager aggregates the data and configures a "virtual" global resource. Global resource configuration data in the form of global resource descriptors then sent back to the blades to apprise the blades of the configuration and access mechanism for the global resource. Drivers are then configured to support access to the global resource. Subsequently, the global resource descriptors are handed off to the operating system during OS load, wherein the virtual global resource appears as a local device to the operating system, and thus is employed as such during OS runtime operations without requiring any modification to the OS code. Flowchart operations and logic according to one embodiment of the process are shown in FIGS. 5 and 7, while corresponding operations and interactions between various components are schematically illustrated in FIGS. 6, 8a, and 8b.

Figure 5:
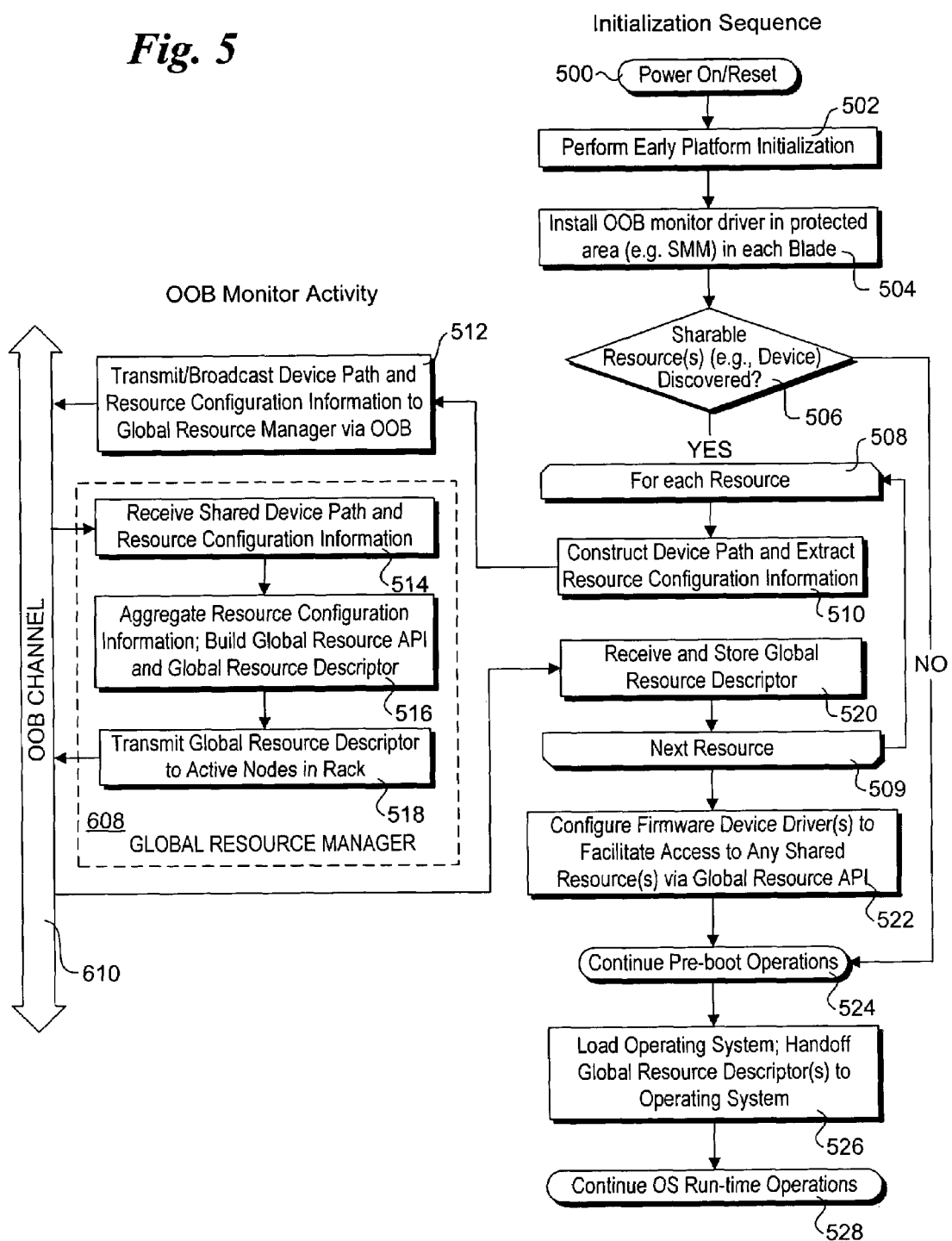
FIG. 5 is a flowchart illustrating operations and logic employed during an initialization process to set up resource sharing in accordance with one embodiment of the invention.
Figure 6:
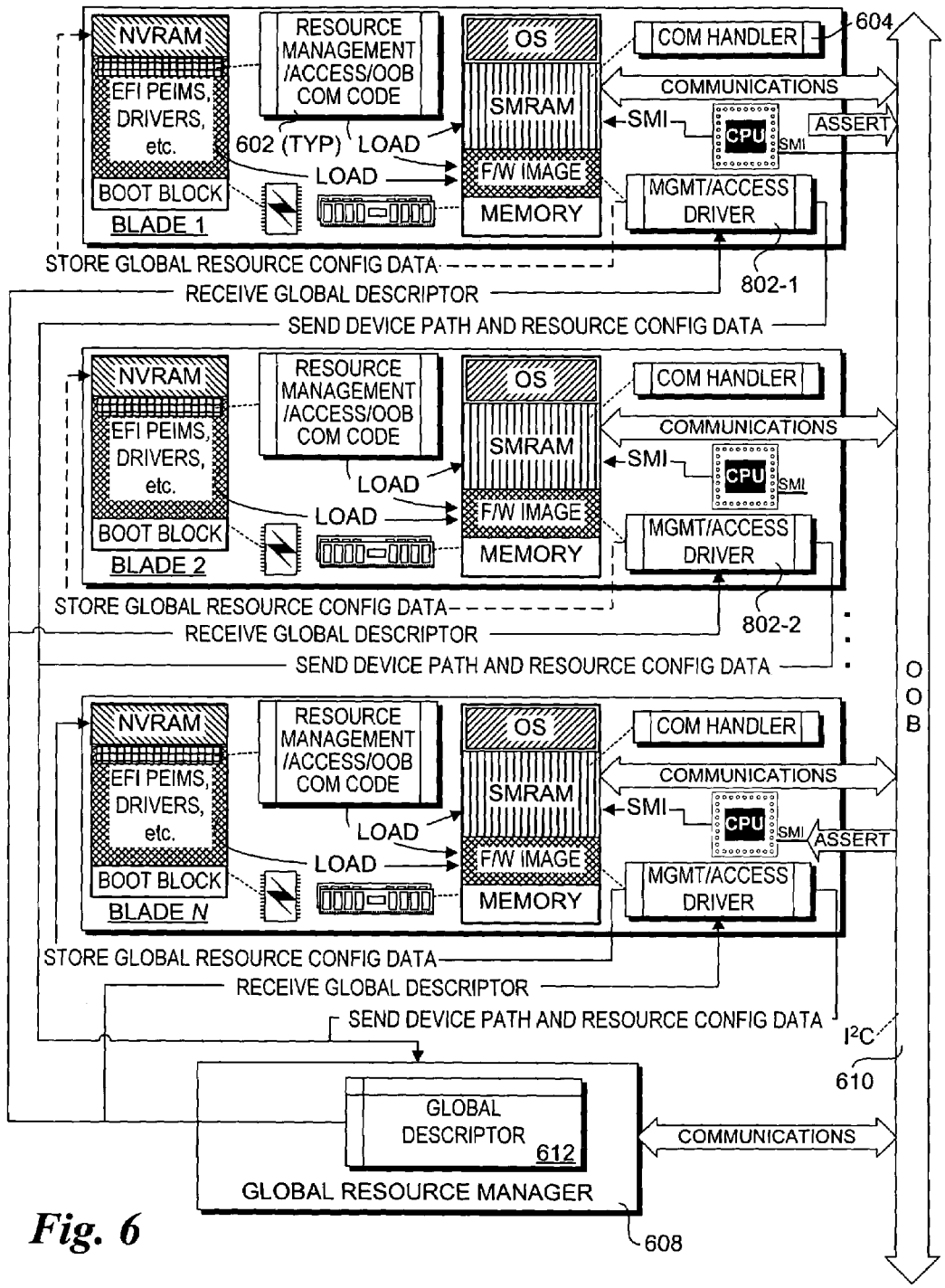
FIG. 6 is a schematic diagram illustrating various data flows that occur during the initialization process of FIG. 6.

With reference to FIG. 5, the process begins by performing several initialization operations on each blade to set up the resource device drivers and the OOB communications framework. In response to a power on or reset event depicted in a start block 500, the system performs pre-boot system initialization operations in the manner discussed above with reference to FIG. 3. First, early initialization operations are performed in a block 502 by loading and executing firmware stored in each blade's boot firmware device (BFD). Under EFI, the BFD comprises the firmware device that stores firmware for booting the system; the BFD for server blade 200 comprises firmware device 208.

Continuing with block 502, processor 202 executes reset stub code that jumps execution to the base address of a boot block of the BFD via a reset vector. The boot block contains firmware instructions for performing early initialization, and is executed by processor 202 to initialize the CPU, chipset, and motherboard. (It is noted that during a warm boot (reset) early initialization is not performed, or is at least performed in a limited manner.) Execution of firmware instructions corresponding to an EFI core are executed next, leading to the DXE phase. During DXE core initialization, the Variable Services are setup in the manner discussed above with reference to FIGS. 3 and 4. After the DXE core is initialized, DXE dispatcher 302 begins loading DXE drivers 304. Each DXE driver corresponds to a system component, and provides an interface for directly accessing that component. Included in the DXE drivers is an OOB monitor driver that will be subsequently employed for facilitating OOB communications.

Next, in a block 504, the OOB monitor driver is installed in a protected area in each blade. As discussed above, an out-of-band communication channel or network that operates independent of network communications that are managed by the operating systems is employed to facilitate inter-blade communication in an OS-transparent manner.

During the foregoing system initialization operations of block 502, a portion of system memory 204 is setup to be employed for system management purposes. This portion of memory is referred to as SMRAM 600 (see FIG. 6), and is hidden from the subsequently-loaded operating system.

In conjunction with the firmware load, SMM OOB communication code 602 stored in firmware is loaded into SMRAM 600, and a corresponding OOB communications SMM handler 604 for handling OOB communications are setup. An SMM handler is a type of interrupt handler, and is invoked in response to a system management interrupt (SMI). In turn, an SMI interrupt may be asserted via an SMI pin on the system's processor. In response to an SMI interrupt, the processor stores its current context (i.e., information pertaining to current operations, including its current execution mode, stack and register information, etc.), and switches its execution mode to its system management mode. SMM handlers are then sequentially dispatched to determine if they are the appropriate handler for servicing the SMI event. This determination is made very early in the SMM handler code, such that there is little latency in determining which handler is appropriate. When this handler is identified, it is allowed to execute to completion to service the SMI event. After the SMI event is serviced, an RSM (resume) instruction is issued to return the processor to its previous execution mode using the previously saved context data. The net result is that SMM operation is completely transparent to the operating system.

Returning to the flowchart of FIG. 5, a determination is made in a decision block 506 to whether one or more sharable resources hosted by the blade is/are discovered. Generally, a shared resource is any blade component or device that is to be made accessible for shared access. Such components and devices include but are not limited to fixed storage devices, removable media devices, input devices (e.g., keyboard, mouse), video devices, audio devices, volatile memory (i.e., system RAM), and non-volatile memory.

If the answer to decision block 506 is YES, the logic proceeds to perform the loop operations defined within respective start and end loop blocks 508 and 509 for each sharable resource that is discovered. This includes operations in a block 510, wherein a device path to describe the shared resource is constructed and configuration parameters are collected. The device path provides external users with a means for accessing the resource. The configuration parameters are used to build global resources, as described below in further detail.

After the operations of block 510 are performed, in the illustrated embodiment the device path and resource configuration information is transmitted or broadcasts to a global resource manager 608 via an OOB communication channel 610 in a block 512. The global resource manager may generally be hosted by an existing component, such as one of the blades or management card 112. As described below, in one embodiment a plurality of local global resource managers are employed, wherein global resource management is handled through a collective process rather than employing a single manager. In cases in which the address of the component hosting the global resource manager is known a priori, a selective transmission to that component may be employed. In cases in which the address is not known, a message is first broadcast over the OOB channel to identify the location of the host component.

OOB communications under the aforementioned SMM hidden execution mode are effectuated in the following manner. First, it is necessary to switch the operating mode of the processors on the blades for which inter-blade communication is to be performed to SMM. Therefore, an SMI is generated to cause the processor to switch into SMM, as shown occurring with BLADE 1 in FIG. 6. This may be effectuated through one of two means—either an assertion of the processors SMI pin (i.e., a hardware-based generation), or via issuance of an "SMI" instruction (i.e., a software-based generation).

In one embodiment an assertion of the SMI pin may be produced by placing an appropriate signal on a management bus or the like. For example, when an SMBUS is deployed using I$^2$C, one of the bus lines may be hardwired to the SMI pins of each blade's processor via that blade's connector. Optionally, the interface plane may provide a separate means for producing a similar result. Depending on the configuration, all SMI pins may be commonly tied to a single bus line, or the bus may be structured to enable independent SMI pin assertions for respective blades. As yet another option, certain network interface chips (NIC), such as those made by Intel®, provide a second MAC address for use as a "back channel" in addition to a primary MAC address used for conventional network communications. Furthermore, these NICs provide a built-in system management feature, wherein an incoming communication referencing the second MAC address causes the NIC to assert an SMI signal. This scheme enables an OOB channel to be deployed over the same cabling as the "public" network (not shown).

In one embodiment, a firmware driver is employed to access the OOB channel. For instance, when the OOB channel is implemented via a network or serial means, an appropriate firmware driver will be provided to access the network or serial port. Since the configuration of the firmware driver will be known in advance (and thus independent of the operating system), the SMM handler may directly access the OOB channel via the firmware driver. Optionally, in the case of a dedicated management bus, such as I$^2$C, direct access may be available to the SMM handler without a corresponding firmware driver, although this latter option could also be employed.

In response to assertion of the SMI pin, the asserted processor switches to SMM execution mode and begins dispatch of its SMM handler(s) until the appropriate handler (e.g., communication handler 604) is dispatched to facilitate the OOB communication. Thus, in each of the OOB communication network/channel options, the OOB communications are performed when the blade processors are operating in SMM, whereby the communications are transparent to the operating systems running on those blades.

In accordance with a block 514, the shared device path and resource configuration information is received by global resource manager 608. In a similar manner, shared device path and resource configuration information for other blades is received by the global resource manager.

In accordance with one aspect of the invention, individual resources may be combined to form a global resource. For example, storage provided by individual storage devices (e.g., hard disks and system RAM) may be aggregated to form one or more "virtual" storage volumes. This is accomplished, in part, by aggregating the resource configuration information in a block 516. In the case of hard disk resources, the resource configuration information might typically include storage capacity, such as number of storage blocks, partitioning information, and other information used for accessing the device. After the resource configuration information is aggregated, a global resource access mechanism (e.g., API) and global resource descriptor 612 are built. The global resource descriptor contains information identifying how to access the resource, and describes the configuration of the resource (from a global and/or local perspective).

After the operations of block 516 are completed, the global resource descriptor 612 is transmitted to active nodes in the rack via the OOB channel in a block 518. This transmission operation may be performed using node-to-node OOB communications, or via an OOB broadcast. In response to receiving the global resource descriptor, it is stored by the receiving node in a block 520, leading to processing the next resource. The operations of blocks 510, 512, 514, 516, 518, and 520 are repeated in a similar manner for each resource that is discovered until all sharable resources are processed.

In accordance with one embodiment, access to shared resources is provided by corresponding firmware device drivers that are configured to access discovered shared resources via their global resource API's in a block 522. Further details of this access scheme when applied to specific resources are discussed below. As depicted by a continuation block 524, pre-boot platform initialization operations are then continued as described above to prepare for the OS load.

During the OS load in a block 526, global resource descriptors corresponding to any shared resources that are discovered are handed off to the operation system. It is noted that the global resource descriptors that are handed off to the OS may or may not be identical to those built in block 516. Essentially, the global resource descriptors contain information to enable the operating system to configure access to the resource via its own device drivers. For example, in the case of a single shared storage volume, the OS receives information indicating that it has access to a "local" storage device (or optionally a networked storage device) having a storage capacity that spans the individual storage capacities of the individual storage devices that are shared. In the case of multiple shared storage volumes, respective storage capacity information will be handed off to the OS for each volume. The completion of the OS load leads to continued OS runtime operations, as depicted by a continuation block 528.

During OS runtime, global resources are accessed via a combination of the operating system and firmware components configured to provide "low-level" access to the shared resource. Under modern OS/Firmware architectures, the device access scheme is intentionally abstracted such that the operating system vendor is not required to write a device driver that is specific to each individual device. Rather, these more explicit access details are provided by corresponding firmware device drivers. One result of this architecture is that the operating system may not directly access a hardware device. This proves advantageous in many ways. Most notably, this means the operating system does not need to know the particular low-level access configuration of the device. Thus, "virtual" resources that aggregate the resources of individual devices may be "built," and corresponding access to such devices may be abstracted through appropriately-configured firmware drivers, whereby the OS thinks the virtual resource is a real local device.

In one embodiment, this abstracted access scheme is configured as a multi-layer architecture, as shown in FIGS. 8*a* and 8*b*. Each of blades BLADE 1 and BLADE 2 have respective copies of the architecture components, including an OS device drivers 800-1 and 800-2, management/access driver 802-1 and 802-2, resource device drivers 804-1 and 804-2, and OOB communication handlers 604-1 and 604-2.

A flowchart illustrating an exemplary process for accessing a shared resource in accordance with one embodiment is shown in FIG. 7. The process begins with an access request from a requester, as depicted in a start block 700. A typical requestor might be an application running on the operating system for the platform. Executable code corresponding to such applications are generally stored in system memory 204, as depicted by runtime (RT) applications (APP) 806 and 808 in FIGS. 8*a* and 8*b*. For instance, suppose runtime application 806 wishes to access a shared data storage resource. In this example, the access request corresponds to opening a previously stored file. The runtime application will first make a request to the operating system (810) to access the file, providing a location for the file (e.g., drive designation, path, and filename). Furthermore, the drive designation is a drive letter previously allocated by the operating system for a virtual global storage resource comprising a plurality of disk drives 218, which include resource 1 of BLADE 1 and resource 2 on BLADE 2.

In response to the request, operating system 810 employs its OS device driver 800-1 to access the storage resource in a block 702. Normally, OS device driver 800-1 would interface directly with resource driver 804-1 to access resource 1. However, management/access driver 802-1 is accessed instead. In order to effectuate this change, interface information such as an API or the like is handed off to the OS during OS-load, whereby the OS is instructed to access management/access driver 802-1 whenever there is a request to access the corresponding resource (e.g., resource 1).

In order to determine which shared resource is to service the request, a mechanism is provided to identify a particular host via which the appropriate resource may be accessed. In one embodiment, this mechanism is facilitated via a global resource map. In the embodiment of FIG. 8*a*, local copies 812-1 and 812-2 of a common global resource map are stored on respective blades BLADE 1 and BLADE 2. In the embodiment of FIG. 8*b*, a shared global resource map 812*a* is hosted by global resource manager 608. The global resource map matches specific resources with the portions of the global resource hosted by those specific resources.

Continuing with the flowchart of FIG. 7, in a block 704 the management/access driver queries local global resource map 812 to determine the host of the resource underlying the particular access request. This resource and/or its host is known as the "resource target;" in the illustrated example the resource target comprises a resource 2 hosted by BLADE 2.

Once the resource target is identified, OOB communication operations are performed to pass the resource access request to the resource target. First, the management/access driver on the requesting platform (e.g., 802-1) asserts an SMI to activate that platforms local OOB communications handler 604-1. In response, the processor on BLADE 1 switches its mode to SMM in a block 708 and dispatches its SMM handlers until OOB communication handler 604-1 is launched. In response, the OOB communication handler asserts an SMI signal on the resource target host (BLADE 2) to initiate OOB communication between the two blades. In response to the SMI, the processor mode on BLADE 2 is switched to SMM in a block 710, launching its OOB communication handler. At this point, Blades 1 and 2 are enabled to communicate via OOB channel 610, and the access request is received by OOB communications handler 604-2. After the resource access request has been sent, in one embodiment an "RSM" instruction is issued to the processor on BLADE 1 to switch the processor's operating mode back to what it was before being switched to SMM.

In a block 712 the access request is then passed to management/access driver 802-2 via its API. In an optional embodiment, a query is then performed in a block 714 to verify that the platform receiving the access request is the actual host of the target resource. If it isn't the correct host, in one embodiment a message is passed back to the requester indicating so (not shown). In another embodiment, an appropriate global resource manager is apprised of the situation. In essence, this situation would occur if the local global resource maps contained different information (i.e., are no longer synchronized). In response, the global resource manager would issue a command to resynchronize the local global resource maps (all not shown).

Continuing with a block 716, the platform host's resource device driver (804-2) is then employed to access the resource (e.g., resource 2) to service the access request. Under the present example, the access returns the requested data file. Data corresponding to the request is then returned to the requester via OOB channel 610 in a block 718. At the completion of the communication, an RSM instruction is issued to the processor on BLADE 2 to switch the processor's operating mode back to what it was before being switched to SMM.

Depending on the particular implementation, the requester's processor may or may not be operating an SMM at this time. For example, in the embodiment discussed above, the requester's (BLADE 1) processor was switched back out of SMM in a block 708. In this case, a new SMI is asserted to activate the OOB communications handler in a block 722. If the SMM mode was not terminated after sending the access request (in accordance with an optional scheme), the OOB communication handler is already waiting to receive the returned data. In either case, the returned data are received via OOB channel 610, and the data are passed to the requester's management/access driver (802-1) in a block 724. In turn, this firmware driver passes the data to back to OS device driver 800-1 in a block 726, leading to receipt of the data by the requester via the operating system in a block 728.

A similar resource access process is performed using a single global resource map in place of the local copies of the global resource map in the embodiment of FIG. 8*b*. In short, many of the operations are the same as those discussed above with reference to FIG. 8*a*, except that global resource manager 608 is employed as a proxy for accessing the resource, rather than using local global resource maps. Thus, the resource access request is sent to global resource manager 608 via OOB channel 610 rather than directly to an identified resource target. Upon receipt of the request, a lookup of global resource map 812*a* is performed to determine the resource target. Subsequently, the data request is sent to the identified resource target, along with information identifying the requester. Upon receiving the request, the operations of blocks 712-728 are performed, with the exception of optional operations 714.

Each of the foregoing schemes offers their own advantages. When local global resource maps are employed, there is no need for a proxy, and thus there is no need to change any software components operating on any of the blade server components. However, there should be a mechanism for facilitating global resource map synchronization, and the management overhead for each blade is increased. The primary advantage of employing a single global resource manager is that the synchronicity of the global resource map is ensured (since there is only one copy), and changes to the map can be made without any complicity required of the individual blades. Under most implementations, the main drawback will be providing a host for the global resource manager functions. Typically, the host may be a management component or one of the blades (e.g., a nominated or default-selected blade).

In one embodiment, a blade that hosts the global resource manager functions is identified through a nomination process, wherein each blade may include firmware for performing the management tasks. In general, the nomination scheme may be based on a physical assignment, such as a chassis slot, or may be based on an activation scheme, such as a first-in ordered scheme. For example, under a slot-based scheme, the blade having the lowest slot assignment for the group would be assigned power arbiter tasks. If that blade was removed, the blade having the lowest slot assignment from among the remaining blades would be nominated to host the global resource manager. Under a first-in ordered scheme, each blade would be assigned in installation order identifier (e.g., number) based on the order the blades were inserted or activated. The global management task would be assigned to the blade with the lowest number, that is the first installed blade to begin with. Upon removal of that blade, the blade with the next lowest installation number would be nominated as the new power arbiter. In order to ensure continued operations across a change in the global resource manager, a redundancy scheme may be implemented wherein a second blade is nominated as a live back-up.

In general, global resource mapping data may be stored in either system memory or as firmware variable data. If stored as firmware variable data, the mapping data will be able to persist across platform shutdowns. In one embodiment, the mapping data are stored in a portion of system memory that is hidden from the operating system. This hidden portion of system memory may include a portion of SMRAM or a portion of memory reserved by firmware during pre-boot operations. Another way to persist global resource mapping data across shutdowns is to store the data on a persistent storage device, such as a disk drive. However, when employing a disk drive it is recommended that the mapping data are stored in a manner that is inaccessible to the platform operating system, such as in the host protected area (HPA) of the disk drive. When global resource mapping data are stored in a central repository (i.e., as illustrated by the embodiment of FIG. 8b), various storage options similar to those presented above may be employed. In cases in which the global resource manager is hosted by a component other than the plurality of server blades (such as hosted by management card 112 or an external management server), disk storage may be safely implemented since these hosts are not accessible by the operating systems running on the blades.

A more specific implementation of resource sharing is illustrated in FIGS. 9a-b and 10a-b. In these cases, the resource being shared comprises disk drives 218. In the embodiment 900 illustrated in FIGS. 9a and 10a, the storage resources provided by a plurality of disk drives 218 are aggregated to form a virtual storage volume "V:" For clarity, the storage resources for each of the disk drives is depicted as respective groups of I/O storage comprising 10 blocks. Furthermore, each of Blades 1-16 are depicted as hosting a single disk drive 218; it will be understood that an actual implementations each blade may host 0-N disk drives (depending on its configuration), that the number of blocks for each disk drive may vary, and that the actual number of blocks will be several orders of magnitude higher than those depicted herein.

From an operating system perspective, virtual storage volume V: appears as a single storage device. In general, the shared storage resources may be configured as 1-N virtual storage volumes, with each volume spanning a respective set of storage devices. In reality, virtual storage volume V: spans 16 disk drives 218. To effectuate this, a global resource map comprising a lookup table 1000 is employed. The lookup table maps respective ranges of I/O blocks to the blade on which the disk drive hosting the I/O blocks resides. In the case of single blades being able to host multiple disk drives, the map would contain further information identifying the specific storage device on each blade. In general, an addressing scheme would be employed rather than simply identifying a blade number; however, the illustrated blade number assignments are depicted for clarity and simplicity.

Figure 9A:
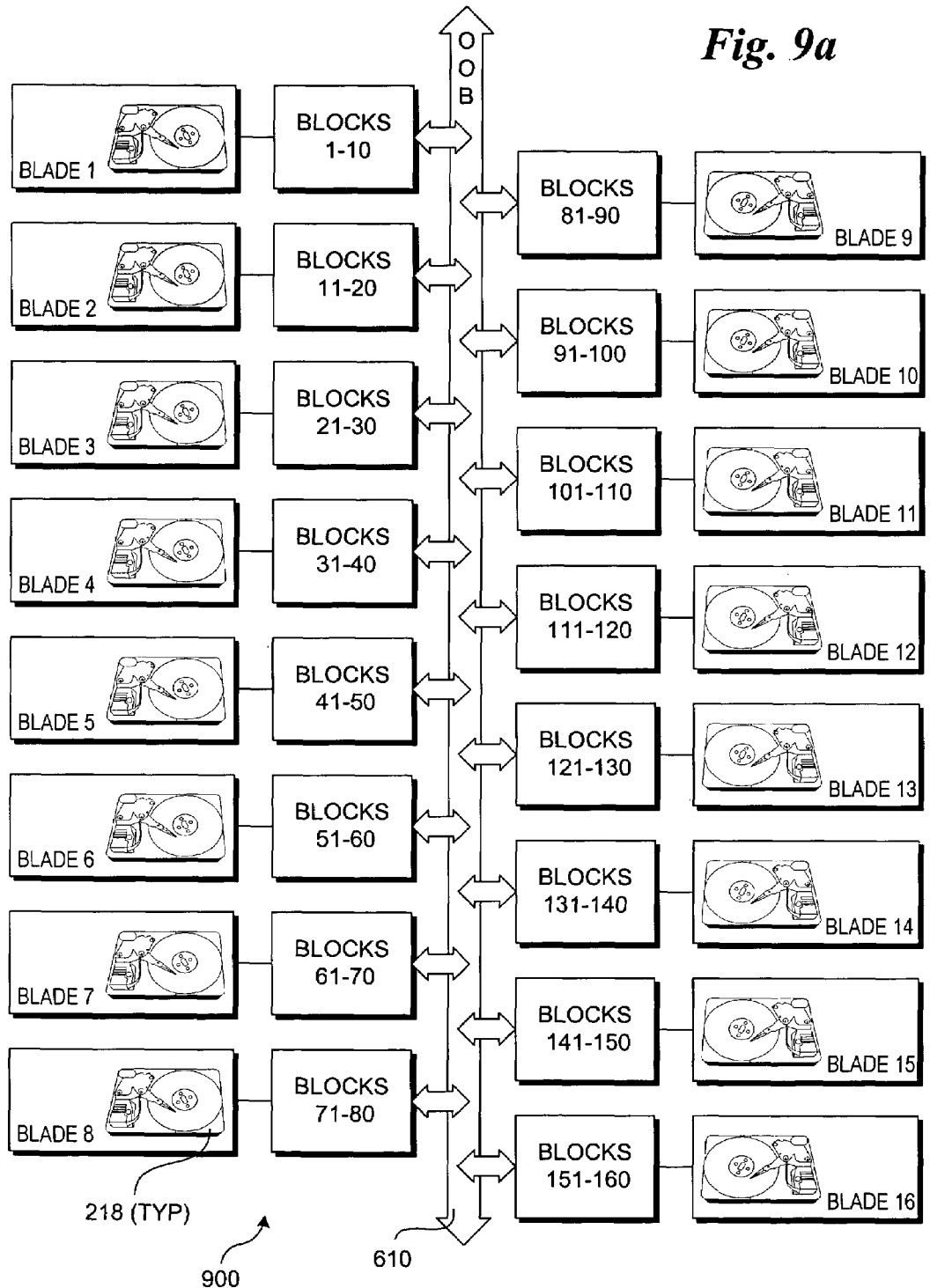
FIG. 9a is a schematic diagram illustrating a share storage resource configured as a virtual storage volume that aggregates the storage capacity of a plurality of disk drives.
Figure 9B:
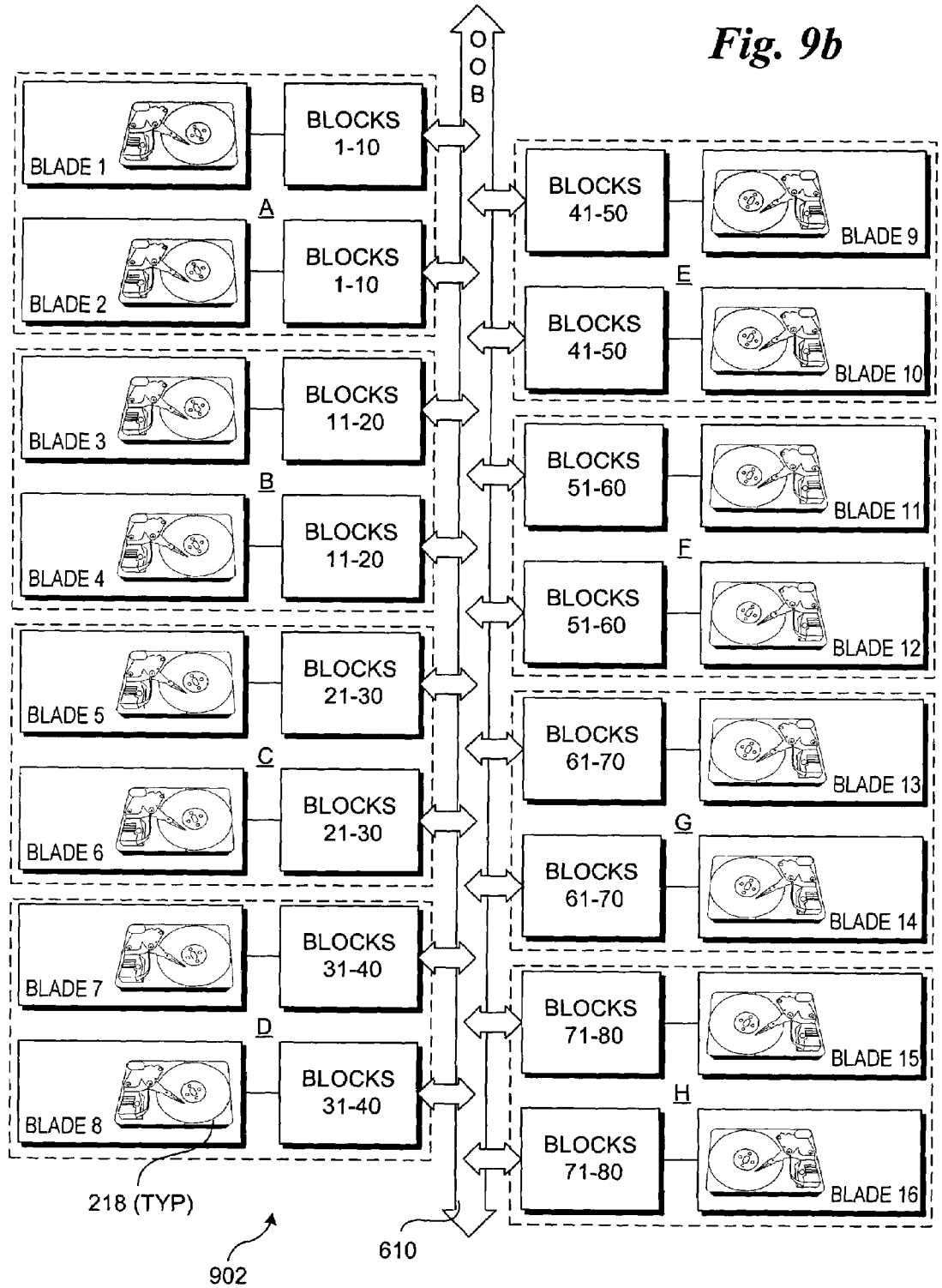
FIG. 9b is a schematic diagram illustrating a variance of the shared storage resource scheme of FIG. 9a, wherein a RAID-1 implementation is employed during resource accesses.
Figure 10A:
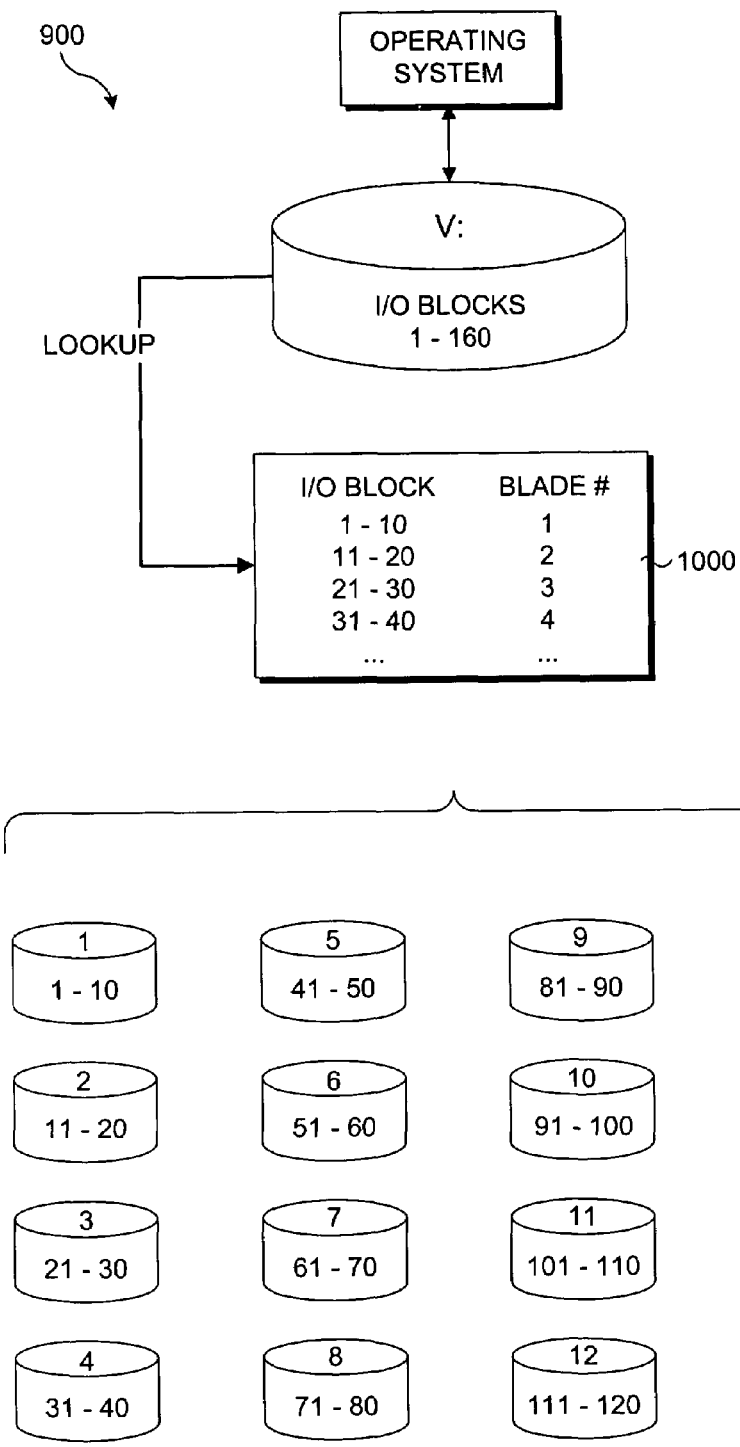
Figure 10B:
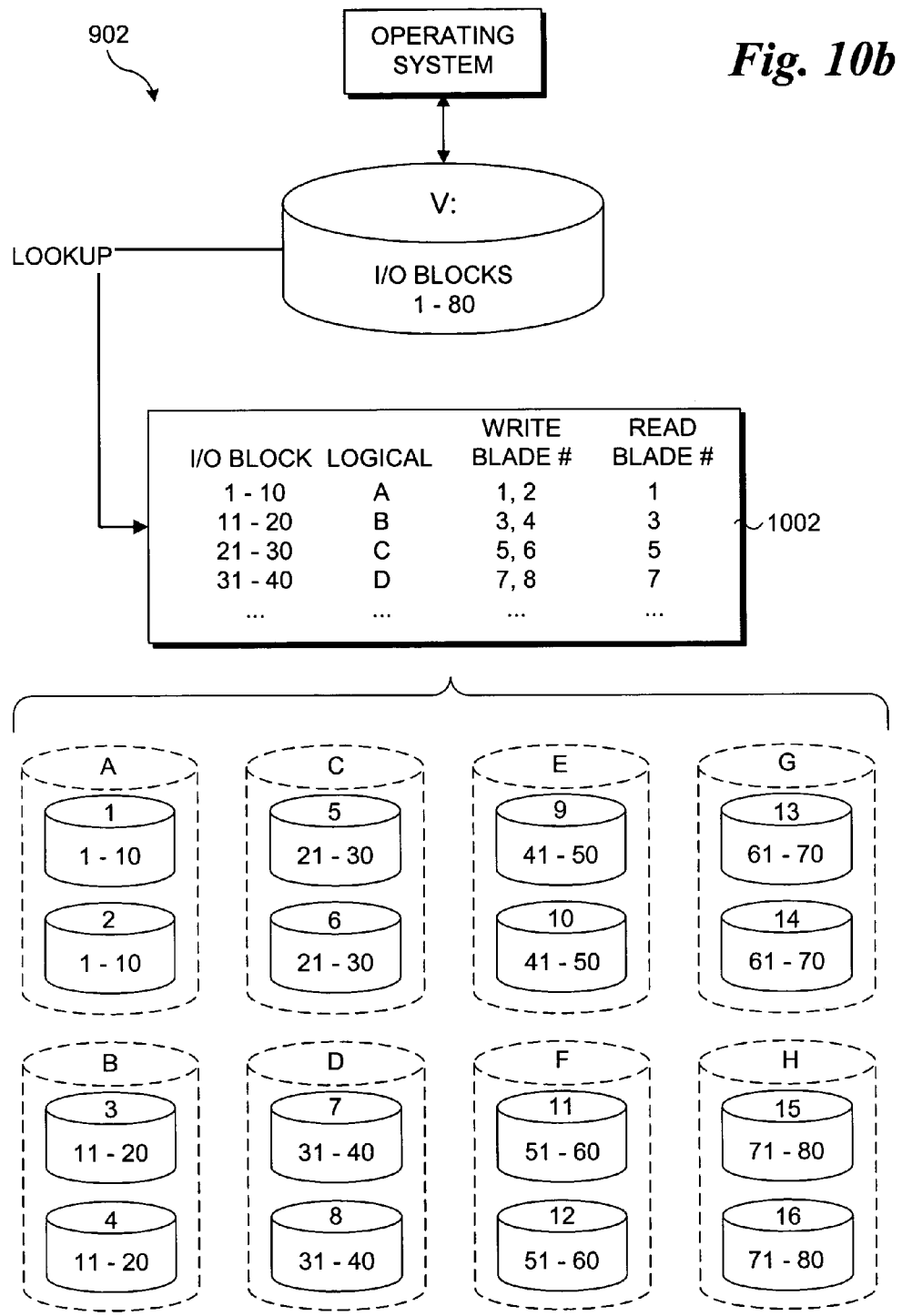
FIG. 10b is a schematic diagram illustrating further details of the RAID-1implementation of FIG. 9b.

FIGS. 9b and 10b illustrate a RAID embodiment 902 using mirroring and duplexing in accordance with the RAID (Redundant Array of Individual Disks)-1 standard. Under RAID-1, respective sets of storage devices are paired, and data are mirrored by writing identical sets of data to each storage device in the pair. In a manner similar to that discussed above, the aggregated storage appears to the operating system as a virtual volume V:. In the illustrated embodiment, the number and type of storage devices are identical to those of embodiment 900, and thus the block I/O storage capacity of the virtual volume is cut in half to 80 blocks. Global resource mappings are contained in a lookup table 1002 for determining what disk drives are to be accessed when the operating system makes a corresponding block I/O access request. The disk drive pairs are divided into logical storage entities labeled A-H.

In accordance with RAID-1 principles, when a write access to a logical storage entity is performed, the data are written to each of the underlying storage devices. In contrast, during a read access, the data are (generally) retrieved from a single storage device. Depending on the complexity of the RAID-1 implementation, one of the pair may be assigned as the default read device, or both of the storage devices may facilitate this function, allowing for parallel reads (duplexing).

In addition to the illustrated configuration, a configuration may employ one or more disk drives 218 as "hot spares." In this instance, the hot spare storage devices are not used during normal access operations, but rather sit in reserve to replace any device or blade that has failed. Under standard practices, when a hot spare replacement occurs, data stored on the non-failed device (in the pair) are written to the replacement device to return the storage system to full redundancy. This may be performed in an interactive fashion (e.g., allowing new data writes concurrently), or may be performed prior to permitting new writes.

Generally, the RAID-1 scheme may be deployed using either a single global resource manager, or via local management. For example, in cases in which "static" maps are employed (corresponding to static resource configurations), appropriate mapping information can be stored on each blade. In one embodiment, this information may be stored as firmware variable data, whereby it will persist through a platform reset or shutdown. For dynamic configuration environments, it is advisable to employ a central global resource manager, at least for determining updated resource mappings corresponding configuration changes.

In addition to RAID-1, other RAID standard redundant storage schemes may be employed, including RAID-0, RAID-2, RAID-3, RAID-5, and RAID-10. Since each of these schemes involves some form of striping, the complexity of the global resource maps increase substantially. For this and other reasons, it will generally be easier to implement RAID-0, RAID-2, RAID-3, RAID-5, and RAID-10 via a central global resource manager rather than individual local managers.

It is noted that although the foregoing principles are discussed in the context of a blade server environment, this is not to be limiting. Each blade may be considered to be a separate platform, such as a rack-mounted server or a stand-alone server, wherein resource sharing across a plurality of platforms may be effectuated via an OOB channel in the manner similar to that discussed above. For example, in a rack-mounted server configuration cabling and/or routing may be provided to support an OOB channel.

A particular implement of the invention that is well-suited to rack-mounted servers and the like concerns sharing keyboard, video, and mouse I/O, commonly known as KVM. In a typical rack server, a KVM switch is employed to enable a single keyboard, video display and mouse to be shared by all servers in the rack. The KVM switch routes KVM signals from individual servers (via respective cables) to single keyboard, video and mouse I/O ports, whereby a KVM signals for a selected server may be accessed by tuning a selection knob or otherwise selecting the input signal source. For high-density servers, the KVM switch may cost $1500 or more, in addition to costs for cabling and installation. KVM cabling also reduces ventilation and accessibility.

Figure 11:
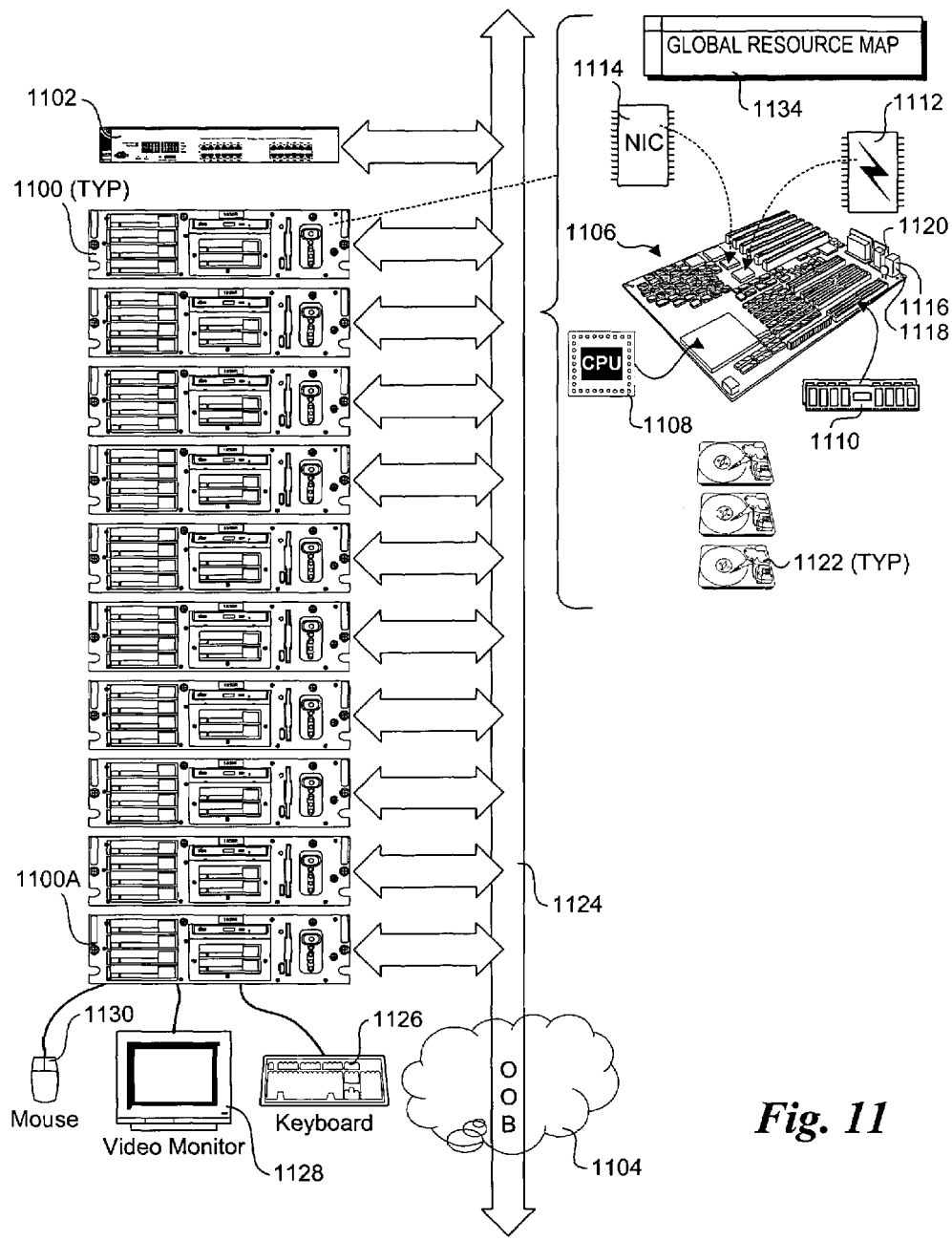
FIG. 11 is a schematic diagram illustrating a shared keyboard, video, and mouse (KVM) access scheme in accordance with one embodiment of the invention.
Figure 12:
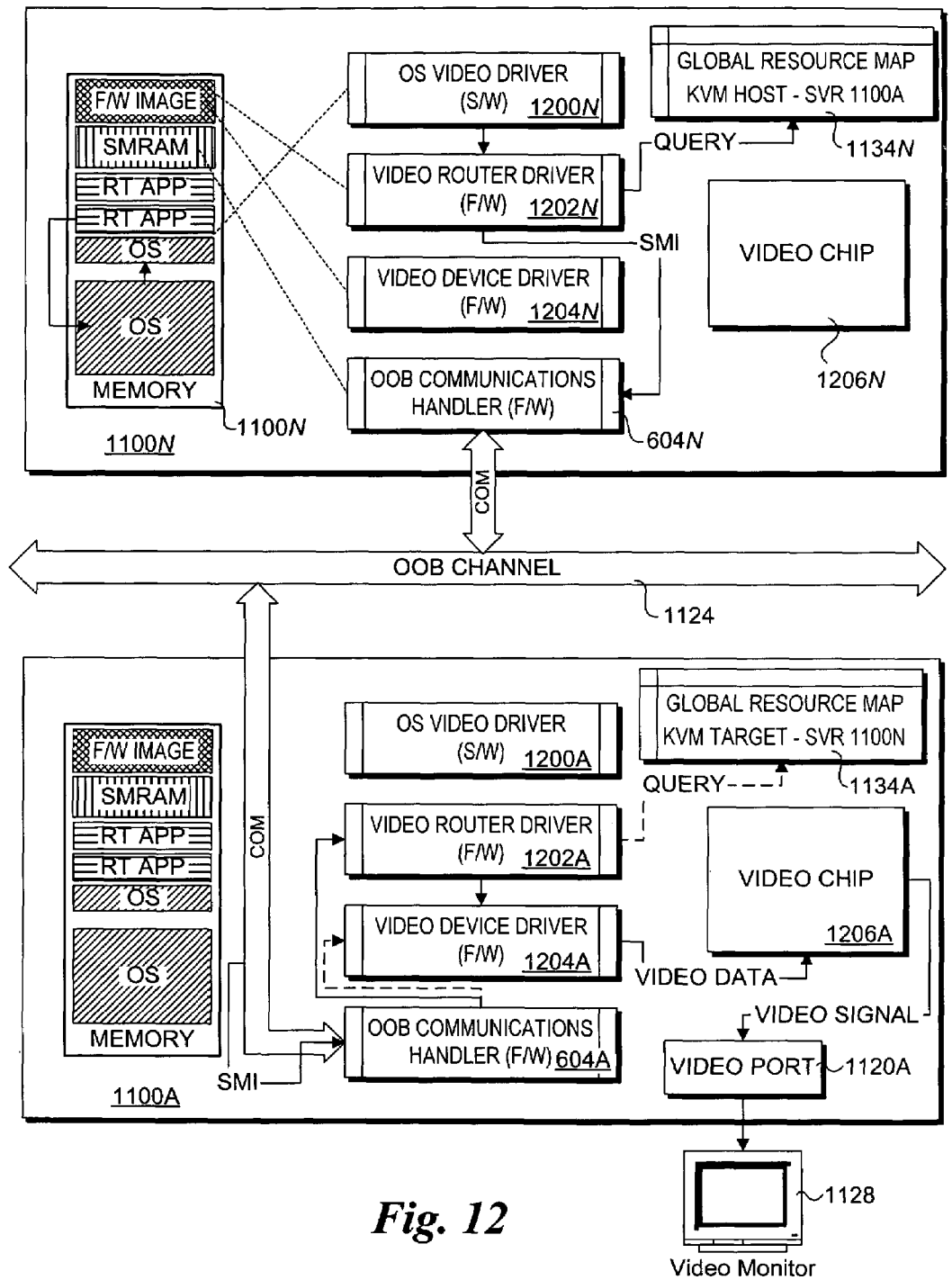
FIG. 12 is a schematic diagram illustrating data flows between a pair of computing platforms to support sharing a video resource.
Figure 13:
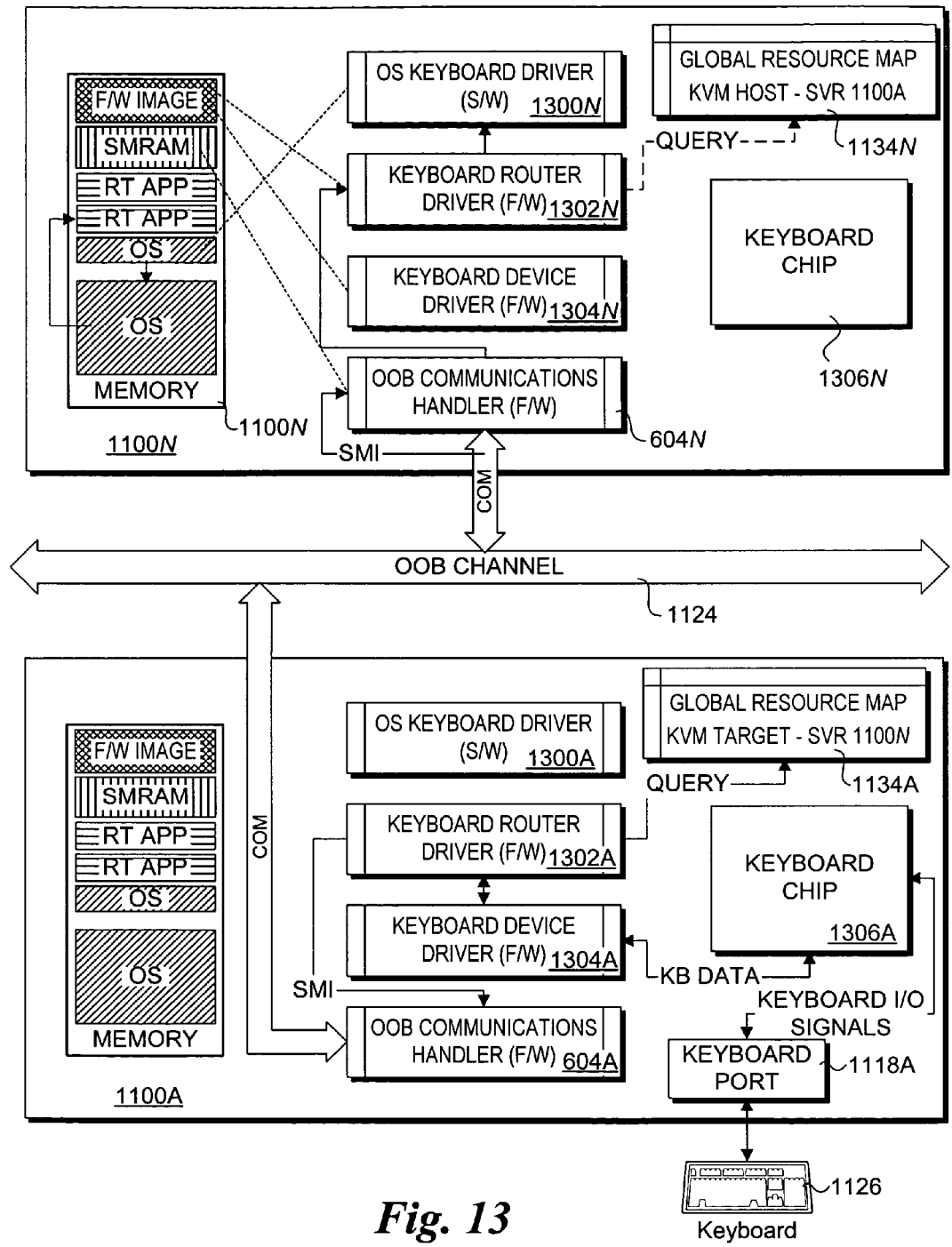
FIG. 13 is a schematic diagram illustrating data flows between a pair of computing platforms to support sharing user input resources.

The foregoing problems are overcome by a shared KVM embodiment illustrated in FIGS. 11-13. In FIG. 11, each of a plurality of rack-mounted servers 1100 is connected to the other servers via a switch 1102 and corresponding Ethernet cabling (depicted as a network cloud 1104). Each server 1100 includes a mainboard 1106 having a plurality of components mounted thereon or coupled thereto, including a processor 1108, memory 1110, a firmware storage device 1112, and a NIC 1114. A plurality of I/O ports are also coupled to the mainboard, including a mouse and keyboard ports 1116 and 1118 and a video port 1120. Typically, each server will also include a plurality of disk drives 1122.

In accordance with the NIC-based back channel OOB scheme discussed above, a second MAC address assigned to the NIC 1114 for each server 1100 is employed to support an OOB channel 1124. A keyboard 1126, video display 1128, and a mouse 1130 are coupled via respective cables to respective I/O ports 1118, 1120, and 1116 disposed on the back of a server 110A. Firmware on each of servers 1110 provides support for hosting a local global resource map 1132 that routes KVM signals to keyboard 1126, video display 1128, and mouse 1130 via server 1100A.

A protocol stack exemplifying how video signals (the most complicated of the KVM signals) are handled in accordance with one embodiment is shown in FIG. 12. In the example, video data used to produce corresponding video signals are rerouted from a server 1100N to server 1100A. The software side of the protocol stack on server 1100N includes an operating system video driver 1200N, while the firmware components include a video router driver 1202N, a video device driver 1204N and an OOB communications handler 604N. The data flow is similar to that described above with reference to FIGS. 7 and 8a, and proceeds as follows.

The operating system running on a server 1100N receives a request to update the video display, typically in response to a user input to a runtime application. The operating system employs its OS video driver 1200N to effectuate the change. Generally, the OS video driver will generate video data based on a virtual video display maintained by the operating system, wherein a virtual-to-physical display mapping is performed. For example, the same text/graphic content displayed on monitors having different resolutions requires different video data particular to the resolutions. The OS video driver then interfaces with video router driver 1202N to pass on the video data to the what it thinks is the destination device, server 1100N's video chip 1206N. As far as the operating system is concerned, video router driver 1202N is the firmware video device driver for the server, i.e., is video device driver 1204N. However, upon receiving the video data, video router driver 1202N looks up the video data destination server via a lookup of global resource map 1134N and asserts an SMI to initiate an OOB communication with server 1100A via respective OOB communication handlers 604N and 604A.

Upon receiving the video data, it is written to a video chip 1206A via video device driver 1204A. In a manner similar to that described above, this passing of video data may be directly from OOB communications handler 604A to video device driver 1204A, or it may be routed through video router driver 1202A. In response to receiving the video data, video chip 1206A updates its video output signal, which is received by video monitor 1128 via video port 1120. As an option, a verification lookup of a global resource map 1134A may be performed to verify that server 1100A is the correct video data destination server.

Keyboard and mouse signals are handled in a similar manner. As with video, operating systems typically maintain a virtual pointer map from which a virtual location of a pointing device can be cross-referenced to the virtual video display, thereby enabling the location of the cursor relative to the video display to be determined. Generally, mouse information will traverse the reverse route of the video signals—that is mouse input received via server 1100A will be passed via the OOB channel to a selected platform (e.g., server 1100N). This will require updating the global resource map 1134A on server 1100A to reflect the proper destination platform. Routing keyboard signals also will require a similar map update. A difference with keyboard signals is that they are bidirectional, so both input and output data rerouting is required.

An exemplary keyboard input signal processing protocol stack and flow diagram is shown in FIG. 13. The software side of the protocol stack on server 1100N includes an operating system keyboard driver 1300N, while the firmware components include a keyboard router driver 1302N, a video device driver 1304N and an OOB communications handler 604N. Similar components comprise the protocol stack of server 1100A.

In response to a user input via keyboard 1126, a keyboard input signal is generated that is received by a keyboard chip 1306A via keyboard port 1118A. Keyboard chip 1306 then produces corresponding keyboard (KB) data that is received by keyboard device driver 1304A. At this point, the handling of the keyboard input is identical to that implemented on a single platform that does not employ resource sharing (e.g., a desktop computer). Normally, keyboard device driver 1304A would interface with OS keyboard driver 1300A to pass the keyboard data to the operating system. However, the OS keyboard driver that is targeted to receive the keyboard data is running on server 1100N. Accordingly, video data handled by keyboard device driver 1304 is passed to keyboard router driver 1302A to facilitate rerouting the keyboard data.

In response to receiving the keyboard data, keyboard router driver queries global resource map 1134 to determine the target server to which the keyboard data is to be rerouted (server 1100N in this example). The keyboard router driver then asserts an SMI to kick the processor running on server 1100A into SMM and passes the keyboard data along with server target identification data to OOB communications handler 604A. OOB communications handler 604A then interacts with OOB communication handler 604N to facilitate OOB communications between the two servers via OOB channel 1124, leading to the keyboard data being received by OOB communications handler 604N. In response to receiving the keyboard data, OOB communications handler 604N forwards the keyboard data to keyboard router driver 1302N. At this point, the keyboard router driver may either directly pass the keyboard data to OS keyboard driver 1300N, or perform a routing verification lookup of global resource map 1134N to ensure that server 1100N is the proper server to receive the keyboard data prior to passing the data to OS keyboard driver 1300N. The OS keyboard driver then processes the keyboard data and provides the processed data to a runtime application having the current focus.

As discussed above, resource sharing is effectuated, at least in part, through firmware stored on each blade or platform. The firmware, which may typically comprise instructions and data for implementing the various operations described herein, will generally be stored on a non-volatile memory device, such as but not limited to a flash device, a ROM, or an EEPROM. The instructions are machine readable, either directly by a real machine (i.e., machine code) or via interpretation by a virtual machine (e.g., interpreted byte-code). Thus, embodiments of the invention may be used as or to support firmware executed upon some form of processing core (such as the CPU of a computer) or otherwise implemented or realized upon or within a machine-readable medium. A machine-readable medium includes any mechanism for storing or transmitting information in a form readable by a machine (e.g., a processor). For example, a machine-readable medium can include media such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for sharing an input device across a plurality of computing platforms, comprising:
    asserting a first System Management Interrupt (SMI) at a first processor included in a first server blade;
    switching an execution mode of the first processor included in the first server blade to a System Management Mode (SMM) in response to the first SMI;
    in response to the first processor entering the SMM, initiating an out-of-band (OOB) communications channel between the first server blade and a second server blade, wherein initiating the OOB communications channel includes asserting a second SMI on a second processor included in the second server blade;
    switching an execution mode of the second processor to the SMM in response to the second SMI;
    routing input data generated at the first server blade to the second server blade over the OOB communications channel, said input data and said first SMI generated in response to receiving an input signal produced by an input device coupled to the first server blade; and
    providing the input data to an operating system running on the second server blade, wherein routing input data to the first and second server blades and providing the input data to the operating system are performed via a first firmware and a second firmware on the first and second server blades, respectively, wherein the first and second firmware utilize an Extensible Firmware Interface (EFI) framework.

2. The method of claim 1, wherein the method is performed via firmware in a manner that is transparent to the operating system running on the second server blade.

3. The method of claim 1, wherein the input device comprises one of a keyboard and mouse.

4. A method for sharing keyboard, video and mouse resources across a plurality of computing platforms, comprising:
    asserting a first System Management Interrupt (SMI) at a first processor included in a resource host server blade;
    switching an execution mode of the first processor included in the resource host server blade to a System Management Mode (SMM) in response to the first SMI;
    in response to the first processor entering the SMM, initiating an out-of-band (OOB) communications channel between the resource host server blade and a target computing platform, wherein initiating the OOB communications channel includes asserting a second SMI on a second processor included in the target computing platform;
    switching an execution mode of the second processor to the SMM in response to the second SMI;
    routing user input data produced at the resource host server blade in response to user inputs via a keyboard and mouse coupled to the resource host server blade to the target computing platform over the OOB communications channel, wherein the first SMI is generated in response to the user inputs;
    providing the user input data to an operating system running on the target computing platform, wherein routing user input data to the target computing platform and providing the user input data to the operating system running on the target computing platform are performed via a first firmware on the resource host server blade and a second firmware on the target computing platform, respectively, wherein the first and second firmware utilize an Extensible Firmware Interface (EFI) framework;
    routing video data produced by an operating system running on the target server blade to the resource host server blade; and
    processing the video data at the resource host server blade to generate a video display signal to drive a video display coupled to the resource host server blade.

5. The method of claim 1, further comprising maintaining global resource mapping information identifying the resource host and the target server blades.

6. The method of claim 5, further comprising maintaining a local copy of the global resource mapping data on each of the plurality of server blades.

7. The method of claim 5, further comprising maintaining the global resource mapping data via a central global resource manager.

8. The method of claim 4, wherein the user input and video data are routed over the out-of-band communication channel.

9. The method of claim 8, wherein the OOB communication channel comprises one of a system management bus, an Ethernet-based network, or a serial communication link.

10. The method of claim 4, wherein the plurality of server blades operate in a blade server environment.

11. The method of claim 4, wherein the method is performed in a manner that is transparent to operating systems running on the plurality of server blades.

12. An article of manufacture comprising a machine-readable medium having instructions stored thereon, which when executed on first and second server blades support sharing of keyboard, video and mouse resources coupled to the first server blade by performing operations including:
asserting a first System Management Interrupt (SMI) at a first processor included in a first server blade;
switching an execution mode of the first processor included in the first server blade to a System Management Mode (SMM) in response to the first SMI;
in response to the first processor entering the SMM, initiating an out-of-band (OOB) communications channel between the first server blade and a second server blade, wherein initiating the OOB communications channel includes asserting a second SMI on a second processor included in the second server blade;
switching an execution mode of the second processor to the SMM in response to the second SMI;
routing input data produced at the first server blade in response to user inputs via the keyboard and mouse to the second server blade over the OOB communications channel, wherein the first SMI is generated in response to the user inputs;
providing the input data to an operating system running on the second server blade; and
routing video data produced by the operating system running on the second server blade to a video signal generation component on the first server blade, wherein routing input data produced at the first server blade to the second server blade and providing the input data to the operating system running on the second server blade are performed via a first firmware and a second firmware on the first and second server blades, respectively, wherein the first and second firmware utilize an Extensible Firmware Interface (EFI)framework.

13. The article of manufacture of claim 12, wherein the article comprises a flash device.

14. The article of manufacture of claim 12, wherein the operations are performed in a manner that is transparent to the operating system running on the second server blade.

15. The method of claim 1, wherein the first and second firmware runs in the pre-boot prior to operating system load.

16. The method of claim 1, wherein the first and second firmware runs during runtime of the operating system.

17. A method for sharing resources across a plurality of computing platforms, the method comprising: receiving a request for a first server blade to access a shared resource hosted by a second server blade; using first firmware located at the first server blade, determining the second server blade via which the shared resource may be accessed, wherein the first firmware implements an Extensible Firmware Interface (EFI) framework; asserting a first System Management Interrupt (SMI) at a first processor included in the first server blade; switching an execution mode of the first processor included in the first server blade to a System Management Mode (SMM) in response to the first SMI; entering the System Management Mode (SMM) at the first server blade; in response to entering the SMM, initiating an out-of-band (OOB) communications channel between the first server blade and the second server blade; wherein initiating the OOB communications channel includes asserting a second SMI on a second processor included in the second server blade; switching an execution mode of the second processor to the SMM in response to the second SMI; entering the System Management Mode (SMM) at the second server blade; sending the request to the second server blade from the first server blade over the OOB communications channel; and using second firmware located at the second server blade, accessing the shared resource, wherein the second firmware implements the EFI framework.

18. The method of claim 17, wherein the method is performed in a manner that is transparent to operating systems running on the plurality of computing platforms.

19. The method of claim 17, wherein the OOB communication channel comprises one of a system management bus, an Ethernet-based network, or a serial communication link.

20. The method of claim 17, wherein a target resource comprises a storage device.

21. The method of claim 20, wherein the resource access request comprises a storage device write request, and the method further comprises sending data corresponding to the storage device write request via the OOB communication channel.

22. The method of claim 20, wherein the resource access request comprises a storage device read request, and the method further comprises:
retrieving data corresponding to the read request from the shared resource; and
sending the data that are retrieved back to the first computing platform via the OOB communication channel.

23. The method of claim 17, further comprising:
maintaining global resource mapping data identifying which resources are accessible via which computing platforms; and
employing the global resource mapping data to determine which computing platform to use to access the shared resource.

24. The method of claim 23, wherein a local copy of the global resource mapping data is maintained on each of the plurality of computing platforms.

25. The method of claim 23, wherein the global resource mapping data is maintained by a central global resource manager.

26. A method for sharing a plurality of storage devices across a plurality of computing platforms, the method comprising:
configuring the plurality of storage devices as a virtual storage volume;
maintaining a global resource map that maps input/output (I/O) blocks defined for the virtual storage volume to corresponding storage devices that actually host the I/O blocks; receiving a data access request identifying an I/O block from which data are to be accessed via the virtual storage volume wherein the request is for a first server blade to access the data; using first firmware located at the first server blade, identifying a second server blade via which a target storage device that actually hosts the I/O block may be accessed through use of the global resource map, wherein the first firmware implements an Extensible Firmware Interface (EFI) framework; asserting a first System Management Interrupt (SMI) at a first processor included in the first server blade;
switching an execution mode of the first processor included in the first server blade to a System Management Mode (SMM) in response to the first SMI; entering the System Management Mode (SMM) at the first server blade; in response to entering the SMM, initiating an out-of-band (OOB) communications channel between the first server blade and the second server blade; wherein initiating the OOB communications channel includes asserting a second SMI on a second processor included in the second server blade; switch SMI an execution mode of the second processor to the SMM in response to the second SMI; entering the System Management Mode (SMM) at the second server blade; routing the data access request to the second server blade that is identified, the data access request being routed from the first server blade to the second server blade over the OOB communications channel; and using second firmware located at the second server blade, accessing the I/O block on the target storage device, wherein the second firmware implements the EFI framework.

27. The method of claim 26, further comprising:
configuring the plurality of storage devices as at least one RAID (redundant array of independent disks) virtual storage volume;
maintaining RAID configuration mapping information that maps input/output (I/O) blocks defined for said at least one RAID virtual storage volume to corresponding storage devices that actually host the I/O blocks; and
employing the RAID configuration mapping information to access appropriate storage devices in response to read and write access requests.

28. The method of claim 27, wherein the RAID virtual storage volume is configured in accordance with the RAID-1 standard.

29. A blade server system, comprising:
a chassis, including a plurality of slots in which respective server blades may be inserted; an interface plane having a plurality of connectors for mating with respective connectors on inserted server blades and providing communication paths between the plurality of connectors to facilitate in out of band (OOB) communication channel; and a plurality of server blades, each including a processor and firmware executable thereon to perform operations including: receive a resource access request from an operating system running on a requesting server blade to access a shared resource hosted by at least a second server blade selected from among the plurality of server blades; using first firmware located at the first server blade, determining a target resource host from among the plurality of server blades that hosts a target resource that may service the resource access request, wherein the first firmware implements an Extensible Firmware Interface (EFI) framework; asserting a first System Management Interrupt (SMI) at a first processor included in the first server blade; switching an execution mode of the first processor included in the first server blade to a System Management Mode (SMM) in response to the first SMI; entering the System Management Mode (SMM) at the first server blade; in response to entering the SMM, initiating an out-of-band (OOB) communications channel between the first server blade and the second server blade; wherein initiating the OOB communications channel includes asserting a second SMI on a second processor included in the second server blade; switching an execution mode of the second processor to the SMM in response to the second SMI; entering the System Management Mode (SMM) at the second server blade; sending the resource access request to the target resource host, the resource access request being sent from the first server blade to the second server blade over the OOB communications channel; and using second firmware located at the second server blade, accessing the target resource via the target resource host to service the resource access request, wherein the second firmware implements the EFI framework.

30. The blade server system of claim 29, wherein the operations are performed in a manner that is transparent to operating systems which are run on the plurality of server blades.

31. The blade server system of claim 29, wherein each processor supports a hidden execution mode that is employed for facilitating communication via the OOB channel.

* * * * *

UNITED STATES PATENT AND TRADEMARK OFFICE
CERTIFICATE OF CORRECTION

| | | |
|---|---|---|
| PATENT NO. | : 7,730,205 B2 | Page 1 of 1 |
| APPLICATION NO. | : 10/808656 | |
| DATED | : June 1, 2010 | |
| INVENTOR(S) | : Rothman et al. | |

It is certified that error appears in the above-identified patent and that said Letters Patent is hereby corrected as shown below:

In column 23, at line 1 delete, "switch SMI" and insert --switching--.

Signed and Sealed this
Third Day of May, 2011

David J. Kappos
*Director of the United States Patent and Trademark Office*